US011809435B2

(12) United States Patent
Krogh et al.

(10) Patent No.: US 11,809,435 B2
(45) Date of Patent: Nov. 7, 2023

(54) EFFICIENT STORAGE, RETRIEVAL, AND/OR RENDERING OF PERSONAL ENTRIES

(71) Applicant: Google LLC, Mountain View, CA (US)

(72) Inventors: Peter Krogh, Nevada City, CA (US); Shikha Kapoor, Sunnyvale, CA (US); Shen-En Shih, Mountain View, CA (US); Max Loh, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 679 days.

(21) Appl. No.: 16/792,509

(22) Filed: Feb. 17, 2020

(65) Prior Publication Data

US 2021/0256031 A1 Aug. 19, 2021

(51) Int. Cl.
*G06F 16/2457* (2019.01)
*G06F 16/242* (2019.01)
(Continued)

(52) U.S. Cl.
CPC ...... *G06F 16/24578* (2019.01); *G06F 16/243* (2019.01); *G06F 16/9035* (2019.01); *G10L 15/22* (2013.01); *H04M 3/4936* (2013.01); *G10L 2015/223* (2013.01); *G10L 2015/228* (2013.01)

(58) Field of Classification Search
CPC ............. G06F 16/24578; G06F 16/243; G06F 16/9035; G10L 15/22; G10L 2015/228; H04M 3/4936
See application file for complete search history.

(56) References Cited

U.S. PATENT DOCUMENTS

| | | | | |
|---|---|---|---|---|
| 2008/0066072 | A1* | 3/2008 | Yurekli | G06Q 10/06 718/104 |
| 2012/0239451 | A1* | 9/2012 | Caligor | G06Q 10/00 705/7.21 |

(Continued)

OTHER PUBLICATIONS

Digneo, G. "How to Use Slack Like a Pro: The Complete Guide". [online] Biz 3.0. Available at: https://biz30. timedoctor.com/how-to-use slack/ [Accessed Feb. 17, 2020].

*Primary Examiner* — Jensen Hu
(74) *Attorney, Agent, or Firm* — Gray Ice Higdon

(57) ABSTRACT

Generation and/or utilization of particular data structure(s) in more efficiently storing, retrieving, and/or presenting personal entry(s) is described herein. Implementations can utilize the data structure(s) in more efficiently responding to a vague user request that specifies a particular type of personal entry, but lacks any additional features of the personal entry(s) sought. Utilization of the data structure(s) can enable responsive personal entry(s) to be efficiently identified (e.g., processor and/or memory efficiency and/or with reduced latency). For example, some implementations can enable selection of a subgroup of personal entries to provide responsive to the vague request, without necessitating any processing of personal entries, that are not included in the selected subgroup, be performed responsive to the request. As another example, some implementations can additionally or alternatively obviate the need to perform any ranking of the available personal entries of the subgroup on the fly responsive to the request.

17 Claims, 9 Drawing Sheets

(51) Int. Cl.
*G06F 16/9035* (2019.01)
*H04M 3/493* (2006.01)
*G10L 15/22* (2006.01)

(56) References Cited

U.S. PATENT DOCUMENTS

| | | | | |
|---|---|---|---|---|
| 2012/0265528 | A1* | 10/2012 | Gruber | G10L 15/18 |
| | | | | 704/235 |
| 2013/0159314 | A1* | 6/2013 | Kao | G06F 16/9562 |
| | | | | 707/E17.089 |
| 2014/0033071 | A1* | 1/2014 | Gruber | G06Q 10/1097 |
| | | | | 715/752 |
| 2014/0317027 | A1* | 10/2014 | Elumalai | G06N 20/00 |
| | | | | 706/11 |
| 2015/0356614 | A1 | 12/2015 | Makedonov | |
| 2017/0004396 | A1 | 1/2017 | Ghotbi et al. | |
| 2021/0119955 | A1* | 4/2021 | Penov | G06V 20/30 |

* cited by examiner

EFFICIENT STORAGE, RETRIEVAL, AND/OR RENDERING OF PERSONAL ENTRIES

BACKGROUND

Automated assistants can be interacted with by a user via a variety of computing devices, such as smart phones, tablet computers, wearable devices, automobile systems, stand-alone personal assistant devices, and so forth. The automated assistants receive input from the user (e.g., typed and/or spoken) and respond with responsive output (e.g., visual and/or audible).

A user can interact with an automated assistant to generate and/or retrieve various personal entries (e.g., reminder personal entries, lists personal entries, etc.). As one example, a user can generate a reminder personal entry through spoken interaction with an automated assistant. For instance, the automated assistant can generate a reminder personal entry responsive to spoken input of "remind me to take out the trash when I get home". As another example, a user can interact with an automated assistant to retrieve a previously generated reminder personal entry. The previously generated reminder personal entry can be, for example one that was created by the user, through prior interaction with the automated assistant or a separate application, or can be one that was generated by another user's interaction(s) and assigned to the user. For instance, responsive to spoken input of "show me my reminders created today", an automated assistant can identify those reminder(s) with a creation date of "today", and provide representation(s) of those reminder(s).

However, for vague requests for personal entries, some automated assistants can fail to generate a response or can, in generating and/or presenting the response, cause excessive usage of client device and/or server resources. As one example, assume a vague user request of "show me my reminders" and further assume that there are 20 currently active reminders for the user. Some automated assistants can respond to such a request by actively processing all 20 currently active reminders to sort them according to only a single criterion (e.g., alphabetical order) and sequentially provide (e.g., audibly and/or in a graphical list) representation(s) of all 20 reminders in response. Such active processing of all 20 reminders can consume processor resource(s) and can also result in latency in generating a response. Additionally or alternatively, the single criterion for sorting the reminders can result in reminder(s) that are pertinent to the requesting user being presented near the end of the presentation. This can cause a long duration of client device resource usage during the presentation while the user awaits presentation of the pertinent reminder(s)—especially in view of interface constraints of various automated assistant(s) (e.g., some automated assistant devices can include only audible user interface output).

SUMMARY

Implementations disclosed herein relate to generation and/or utilization of particular data structure(s) in more efficiently storing, retrieving, and/or rendering personal entry(s). For example, implementations can utilize the data structure(s) in more efficiently responding to a user request, such as a vague user request that specifies a particular type of personal entry (e.g., a reminder type, a list type, a genus type that encompasses reminder, list, and/or other type(s)), but lacks any additional features of the personal entry(s) sought. As described in more detail herein, utilization of the data structure(s) can enable responsive personal entry(s) to be efficiently identified (e.g., processor and/or memory efficiency and/or with reduced latency). For example, some implementations can enable selection of a subgroup of available personal entries to provide responsive to a vague request, without necessitating any processing of personal entries, that are not included in the selected subgroup, be performed responsive to the request. As another example, some implementations can additionally or alternatively obviate the need to perform any ranking of the available personal entries of the subgroup on the fly responsive to the request, as the ranking can be effectively reflected in the data structure in advance of the request (e.g., via container rankings and personal entry rankings within the container). Moreover, and as also described herein, new personal entries can be efficiently added to the data structure and effectively ranked within the data structure, and/or stale items efficiently removed from the data structure.

In some implementations, a method performed by one or more processors of a client device is provided herein. The method includes processing audio data that captures a spoken utterance of a user and that is detected via one or more microphones of a client device, determining, based on processing the audio data, that the spoken utterance includes a request for personal entries that are assigned to a particular type, without specifying any additional features, of the personal entries, that are in addition to the type, and, in response to determining that the spoken utterance includes the request for the personal entries that are assigned to the particular type, without specifying the additional features, selecting, from a group of personal entries that are each access-restricted, personal to the user, and assigned to the particular type, only a subgroup of the personal entries. Selecting only the subgroup of the personal entries includes accessing a data structure that: for each personal entry of the group of personal entries, assigns the personal entry as a member of only a corresponding subset of a plurality of disparate containers, the containers being for the particular type and being assigned container rankings that rank the containers relative to one another, and for each container, of the disparate containers, that is non-empty and includes at least two of the personal entries assigned as members, includes assigned personal entry rankings that rank the personal entries assigned as members, of the container, relative to one another. Selecting only the subgroup of the personal entries further includes selecting, based on the container rankings, one or more non-empty of the disparate containers, and selecting, based on the personal entry rankings and from the selected one or more non-empty of the disparate containers, the personal entries to include in the subgroup. The method further includes causing a representation of at least one of the personal entries, of the subgroup, to be rendered at the client device as an initial response to the spoken utterance.

These and other implementations of the technology can include one or more of the following features.

In some implementations, selecting, based on the container rankings, the one or more non-empty of the disparate containers includes initially selecting, based on the container rankings, a highest ranking container of the non-empty of the disparate containers, and selecting, based on the personal entry rankings and from the selected one or more non-empty of the disparate containers, the personal entries to include in the subgroup includes initially selecting, based on the personal entry rankings of the personal entries assigned as members of the highest ranking container, a plurality of the personal entries that are members of the highest ranking container to include in the subgroup.

In some versions of those implementations, selecting only the subgroup of the personal entries further includes determining that the plurality of the personal entries selected in the initially selecting satisfies a threshold quantity of personal entries to include in the subgroup, and, in response to determining that the plurality of the personal entries selected in the initially selecting satisfies the threshold quantity, refraining from selecting any additional of the disparate containers.

In some versions of those implementations, selecting only the subgroup of the personal entries further includes determining that the plurality of the personal entries selected in the initially selecting fails to satisfy a threshold quantity of personal entries to include in the subgroup, and selecting, based on the container rankings, the one or more non-empty of the disparate containers further includes, in response to determining that the plurality of the personal entries selected in the initially selecting fails to satisfy the threshold quantity, next selecting, following the initially selecting, a second highest ranking container of the non-empty of the disparate containers, and selecting, based on the personal entry rankings and from the selected one or more non-empty of the disparate containers, the personal entries to include in the subgroup includes, in response to next selecting the second highest ranking container, next selecting, based on the personal entry rankings of the personal entries assigned as members of the second highest ranking container, a plurality of the personal entries that are members of the second highest ranking container to include in the subgroup.

In some further versions of those implementations, the method further includes determining the threshold quantity based on one or more properties of the client device.

In some implementations, only a subset of the non-empty of the disparate containers are selected during selecting only the subgroup of the personal entries.

In some implementations, a highest ranking container, of the containers, according to the personal entry rankings, is restricted to including, as members, personal entries that were created and/or edited within a threshold duration of a current time. In some versions of those implementations, the threshold duration is less than twenty four hours.

In some implementations, the method further includes, determining, based on one or more dynamic properties of the client device, a current state of the client device when the spoken utterance is captured, and determining the container rankings, used in the selecting, based on the current state of the client device. In some versions of those implementations, the current state of the client device indicates that the user is in transit, and determining the container rankings, used in the selecting, based on the current state of the client device includes increasing a ranking of a given container, of the containers, that is restricted to including, as members, personal entries that each include at least one location-based triggering criterion.

In some implementations, the data structure and the personal entries are stored locally at the client device prior to processing the audio data that captures the spoken utterance, and the one or more processors are of the client device.

In some implementations, the type is a reminder type or a list type, or is a genus type that encompasses the reminder type and the list type.

In some implementations, the method further includes, prior to processing the audio data that captures the spoken utterance, generating, based on one or more instances of user interface input received at the client device or an additional client device, a given personal entry, of the personal entries of the corpus, that is of the type, assigning, in the data structure, the given personal entry as a member of at least a given container of the containers, and generating a given personal entry ranking for the given personal entry, for the given container, based on comparing one or more properties of the given personal entry to one or more other properties of other personal entries assigned as members of the given container, and the given personal entry ranking is one of the personal entry rankings for the given container.

In some implementations, the method further includes, prior to processing the audio data that captures the spoken utterance, generating, based on one or more instances of user interface input received at the client device or an additional client device, a given personal entry, of the personal entries of the corpus, that is of the type, assigning, in the data structure, the given personal entry as a member of at least a given container of the containers, and generating a given personal entry ranking for the given personal entry, for the given container, based on comparing one or more properties of the given personal entry to one or more other properties of other personal entries assigned as members of the given container, and the given personal entry ranking is one of the personal entry rankings for the given container.

In some versions of those implementations, the given container is restricted to including, as members, personal entries that were created and/or edited within a threshold duration of a current time, and assigning, in the data structure, the given personal entry as a member of at least the given container of the containers includes assigning the given personal entry to the given container based on the given personal entry being created within the threshold duration, and assigning, to the given personal entry, a time to live value that causes removal of the given personal entry from the given container after expiration of the threshold duration.

In some further versions of those implementations, assigning, in the data structure, the given personal entry as a member of at least the given container of the containers includes, prior to or after expiration of the threshold duration, assigning the given personal entry to an additional given container, and assigning the given personal entry to the additional given container is based on at least one property, of the given personal entry, conforming to a requirement of the additional given container, where the at least one property is in addition to a creation time or edit time of the given personal entry.

In some implementations, the method further includes, prior to processing the audio data that captures the spoken utterance, determining that a given personal entry, assigned in the data structure to at least a given container of the containers, is stale, and, responsive to determining that the given personal entry is stale, removing, from the data structure, any assignment of the given personal entry to any of the containers.

In some implementations, a method performed by one or more processors of a client device is provided herein. The method includes processing audio data that captures a spoken utterance of a user and that is detected via one or more microphones of a client device, determining, based on processing the audio data, that the spoken utterance includes a request for personal entries that are assigned to a particular type, without specifying any additional features, of the personal entries, that are in addition to the type, and, in response to determining that the spoken utterance includes the request for the personal entries that are assigned to the particular type, without specifying the additional features, determining a subgroup, of the personal entries, to render responsive to the spoken utterance. Determining the subgroup of the personal entries includes, until the subgroup includes a threshold quantity of the personal entries, selecting a currently active container, of a plurality of containers for the particular type, wherein selecting the currently active container is based on it being non-empty, is based on it being not yet selected responsive to the spoken utterance, and is according to corresponding container rankings for the containers, adding, to the initial group, a corresponding personal entry that is assigned to the currently active container. Adding the corresponding personal entry to the initial group is based on it having the highest assigned personal entry ranking amongst all personal entries, of the currently active container, that have not yet been added to the subgroup. Determining the subgroup of the personal entries further includes repeating the adding if any of the personal entries, assigned to the currently active container, have not yet been added to the subgroup, and if all personal entries, assigned to the currently active container, have been added to the subgroup, repeating the selecting to select a new currently active container, and performing one or more iterations of the adding for the new currently active container. The method further includes causing a representation of at least one of the personal entries, of the subgroup, to be rendered at the client device as an initial response to the spoken utterance.

In some implementations, a method performed by one or more processors of a client device is provided herein. The method includes generating a given reminder based on one or more instances of user interface input, of a user, that are received at a client device, and accessing a data structure that is personal to the user and that: for each reminder of a plurality of reminders, assigns the reminder as a member of only a corresponding subset of a plurality of disparate containers, the containers being assigned container rankings that rank the containers relative to one another, and for each container, of the disparate containers, that is non-empty and includes at least two of the reminders assigned as members, includes assigned personal entry rankings that rank the reminders assigned as members, of the container, relative to one another. The method further includes selecting a given container, of the containers, based on determining that one or more properties of the reminder correspond to one or more criteria for the given container, responsive to selecting the given container, assigning, in the data structure, the given reminder as a member of the given container, and generating a given personal entry ranking for the given reminder, for the given container, using one or more ranking criteria that are assigned to the given container and that are not assigned to one or more additional of the containers.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
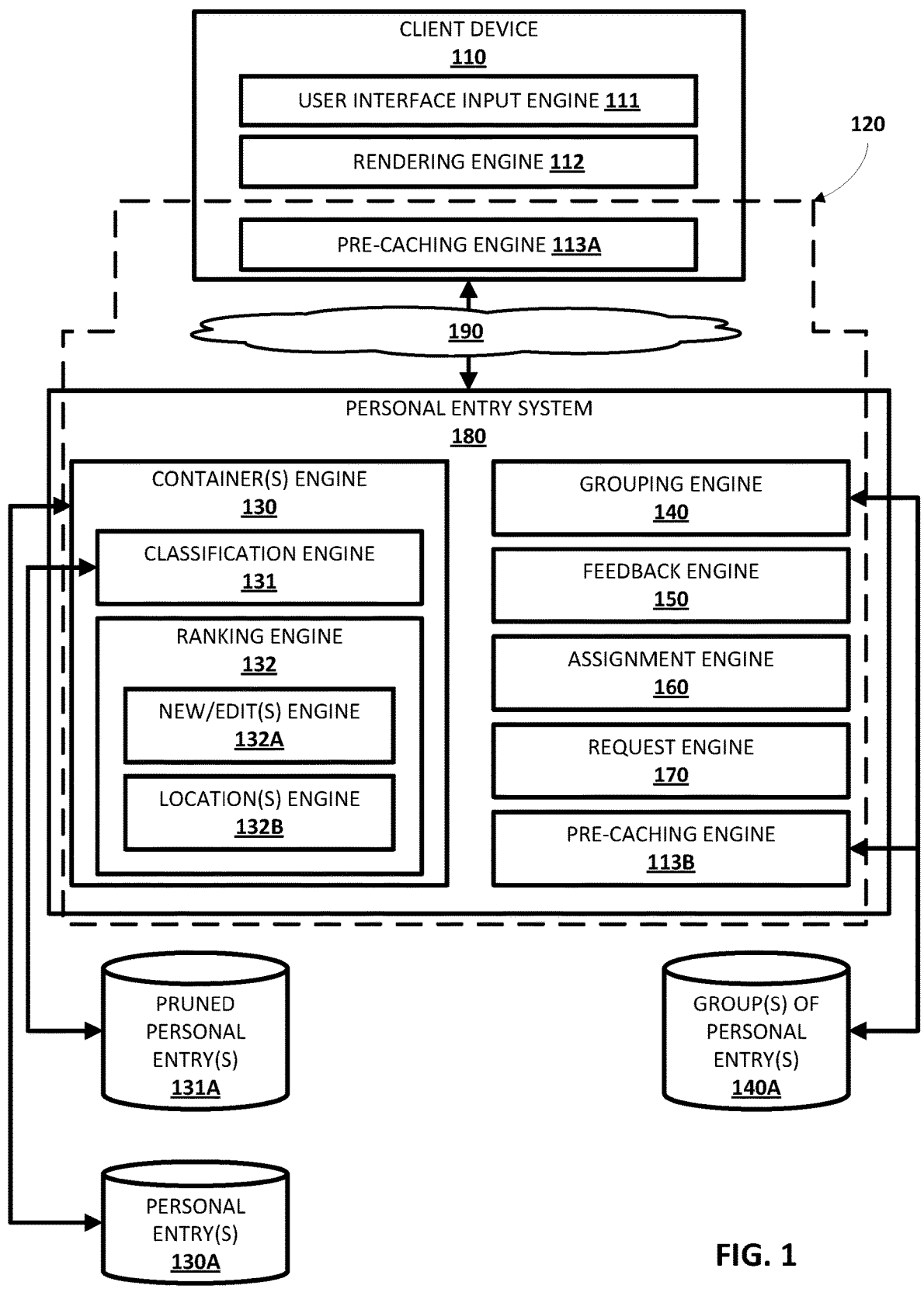
FIG. 1 depicts a block diagram of an example environment that demonstrates various aspects of the present disclosure, and in which implementations disclosed herein may be implemented.

FIG. 1 depicts a block diagram of an example environment that demonstrates various aspects of the present disclosure, and in which implementations disclosed herein may be implemented. A client device 110 is illustrated in FIG. 1, and includes, in various implementations, a user interface input engine 111, a rendering engine 112, and a pre-caching engine 113A.

Although not depicted for the sake of brevity, it should be understood that the client device 110 can further include additional engines, model(s), and/or other components. For example, the client device 110 can also include a speech recognition engine that can process, using speech recognition model(s), audio data (e.g., detected via microphone(s) of the client device 110) that captures a spoken utterance of a user of the client device 110 to generate recognized text. Further, the client device 110 can also include a natural language understanding engine that can process, using natural language understanding model(s), text (e.g., recognized text generated by the speech recognition engine and/or other text based on user interface input detected by the user interface input engine 111) to determine an intent of the user (e.g., request for personal entry(s)). Moreover, the client device 110 can also include a text-to-speech engine that can process, using text-to-speech model(s), responsive text (and/or phonemes of the responsive text) to generate synthesized speech audio data that includes synthesized speech to be rendered by the rendering engine 112 of the client device 110 (e.g., via speaker(s) of the client device 110) in response to a user request for personal entry(s). Moreover, although these additional engines, model(s), and/or other components are described above as performing operations locally on the client device 110, it should be understood that these operations can also be performed remotely using additional computing devices (e.g., server(s)) in communication with the client device 110 over network(s) 190 (e.g., Wi-Fi, Bluetooth, near-field communication, local area network(s), wide area network(s), and/or other networks).

The user interface input engine 111 can detect user interface input at the client device 110. The user interface input detected at the client device 110 can include a spoken utterance detected via microphone(s) of the client device 110, touch input detected via a user interface of the client device 110, and/or typed input detected via the user interface of the client device 110. As described herein, the client device 110 can process the detected user interface input to determine text that corresponds to the detected user interface input. For example, the user interface input engine 111 can detect a spoken utterance of a given user of the client device 110, and the client device 110 can generate, using speech recognition model(s), text corresponding to the spoken utterance. As another example, the user interface input engine 111 can detect typed input and/or touch input at a user interface of the client device 110, and can determine text corresponding to the typed input and/or touch input. Further, the client device 110 can process the text to determine an intent of the user of the client device. For example, the client device 110 can process, using natural language understanding model(s), the text corresponding to the detected user interface input to determine the intent of the user included in the detected user interface input. In some implementations, the rendering engine 112 can visually render the text via a user interface of the client device 110. By rendering the text on the user interface of the client device 110, the client device 110 can display a transcription of a dialog between the user of the client device and an automated assistant 120 (e.g., indicated by dashed lines in FIG. 1).

Notably, the automated assistant 120 can perform the operations of the engines, model(s), and/or other components contained within the dashed lines. Moreover, although the automated assistant 120 of FIG. 1 is depicted as operating both locally on the client device 110 and remotely over the network(s) 190, it should be understood that the automated assistant 120 can operate only on the client device 110 as a local automated assistant and communicate with a remote automated assistant that has access to the personal entry system 180 or that the automated assistant. As described herein, the automated assistant can cause the client device 110 and/or the personal entry system 180 to perform one or more operations.

The automated assistant 120 can cause the client device 110 to transmit text corresponding to detected user interface input at the client device 110 and/or transmit an intent corresponding to the detected user interface input to a personal entry system 180 over the network(s) 190. The intent corresponding to the user input can indicate personal entries of a particular type are being requested by the user of the client device 110. The particular types of personal entries can include, for example, reminders, lists, task entries, email messages, text messages, SMS messages, calendar entries, and/or other particular types of personal entries. In some implementations, the user input can be a vague request for a particular type of personal entry. A vague request for a particular type of personal entry can specify a desire to view personal entry(s) of the particular type, but can lack any additional features (e.g., created by the user, assigned to the user, trigger time, trigger location, creation time, and/or other features) of the particular type of personal entries. For example, audio data may capture a spoken utterance of "Show me my calendar entries" without specifying a day and/or time associated with any calendar entry. In some other implementations, the user input can also specify additional features of the personal entries that are in addition to the type. For example, audio data may capture a spoken utterance of "Show me my calendar entries for today" that specifies a temporal features of "today".

The personal entry system 180 can include a container(s) engine 130, a grouping engine 140, a feedback engine 150, an assignment engine 160, a request engine 170, and a pre-caching engine 113B. The request engine 170 can receive, from the client device 110 and over the network(s) 190, the text corresponding to detected user interface input and/or the intent corresponding to the detected user interface input. Further, the request engine 170 can provide an indication of the particular type of personal entries requested by the user to the container(s) engine 130. Although the personal entry system 180 is depicted as communication with the client device 110 over the network(s), that is for the sake of illustration and is not meant to be limiting. It should be understood that the personal entry system can also be implemented locally on the client device 110.

The container(s) engine 130 can further include a classification engine 131, and a ranking engine 132 having a new/edit(s) engine 132A and a location(s) engine 132B. Further, the container(s) engine 130 can access a personal entry(s) database 130A to retrieve personal entries of the particular type. The personal entry(s) database 130A can include personal entries that are personal to a user (e.g., created by the user, assigned to the user, and/or otherwise associated with the user), and the personal entry(s) in the personal entry(s) database 130A can be indexed according to the particular type of personal entry and/or indexed by additional features of the personal entries. In some implementations, the personal entry(s) database 130A can be an access-restricted database, such that one or more access restrictions (e.g., a limiting condition on who can view and/or access the personal entries) can be placed on the personal entry(s) database 130A due to the personal nature of the personal entries described herein. Further, the assignment engine 160 can receive personal entries that are assigned to a user of the client device 110 by additional user(s) via respective computing devices and/or a common computing device of the user of the client device 110 and the additional user(s). For example, if a reminder of "buy milk at the grocery store" is assigned to the user of the client device 110 by an additional user via a shared computing device of the user and the additional user, then the assignment engine 160 can cause the reminder to be stored in the personal entry(s) database 130A, and the reminder can be indexed in the personal entry(s) database 130A with other reminders.

Further, the container(s) engine 130 can access the personal entry(s) database 130A to determine an initial superset of personal entries that are responsive to user interface input requesting the personal entries, and can provide the initial superset of the personal entries to the classification engine 131. For example, if user interface input detected by the user interface input engine 111 indicates that the user of the client device 110 provided a vague request of "show me my reminders", then the container(s) engine 130 can access the personal entry(s) database 130A to retrieve all personal entries that are indexed as reminders, and can provide those reminders to the classification engine 131 as an initial superset of personal entries. As another example, if user interface input detected by the user interface input engine 111 indicates that the user of the client device 110 provided a specific request of "show me my reminders for today", then the container(s) engine 130 can access the personal entry(s) database 130A to retrieve all personal entries that are further indexed as reminders with a trigger time that occurs that day, and can provide those reminders to the classification engine 131 as an initial superset of personal entries.

In some implementations, the classification engine 131 can classify (or assign)) the personal entries of the initial superset of personal entries that are responsive to user interface input requesting the personal entries. In some implementations, the classification engine 131 can prune a subset of personal entry(s) from the initial superset of personal entries as a pre-processing step. The classification engine 131 can determine the subset of personal entry(s) to prune based on one or more pruning criteria. The pruning criteria can include, for example, temporal criteria based on a trigger time and/or creation time associated with a given personal entry, locational criteria based on a trigger location associated with a given personal entry, completion criteria, and/or other criteria. For example, if a given personal entry is a reminder that is marked as done or a past calendar entry, then those reminder(s) and/or calendar entries can be pruned from the initial superset of personal entries based on the completion criteria. As another example, if a given personal entry is a reminder that is long overdue (e.g., stale reminder), then those reminder(s) can be pruned from the personal entries based on the temporal criteria. By pruning the subset of personal entry(s) from the initial superset of personal entries, the classification engine 131 need only process only those pertinent personal entries, thereby conserving computational and/or network resources that would otherwise be wasted processing personal entries that are not pertinent. Moreover, the classification engine 131 can cause the subset of pruned personal entry(s) to be stored in a pruned personal entry(s) database 131A, rather than discard the subset of pruned personal entry(s) altogether. This allows the subset of pruned personal entry(s) to be quickly and efficiently accessed at a later time if so desired.

The classification engine 131 can classify (or assign) each of the personal entries of the superset of personal entries (or the remaining personal entries if a subset of personal entries is pruned form the initial subset of personal entries) into one or more of N containers, where N is a positive integer greater than one. The containers can be a data structure that allows for personal entries to be partitioned into a hierarchy of personal entries that are temporally and/or locationally pertinent to a user of the client device 110. Further, the containers can be, for example, defined using one or more heuristic techniques, defined based on analyzing interaction logs between a user of the client device 110 and the automated assistant 120, defined based on one or more rules generated using machine learning techniques, and/or defined using other techniques. The classification engine 131 can classify the personal entries into one or more of the containers based on one or more classification criteria. The classification criteria can include, for example, personal entries having a trigger time within a threshold range of time with respect to a current time, a creation time within a threshold range of time with respect to a current time, a trigger location, a trigger location within a threshold distance with respect to a current location of the given user of the computing device, whether the given user created the personal entry(s), whether the personal entry(s) were assigned to the given user of the computing device by an additional user, and/or other criteria. For example, personal entries that were created by the given user and/or assigned to the given user within the last fifteen minutes can be classified into a first container regardless of trigger time and/or trigger location, personal entries having a trigger time between eight hours ago and midnight tomorrow can be classified into a second container, personal entries having a trigger time between midnight tomorrow but within the next week can be classified into a third container, personal entries having a trigger location that are assigned to the user more than fifteen minutes ago can be classified into a fourth container, personal entries having a trigger location that are created by the user more than fifteen minutes ago can be classified into a fifth container, and so on. It should be understood that the classification criteria for above containers is provided for the sake of example, and is not meant to be limiting. Moreover, in some implementations, the classification criteria for the containers can initially be defined according to one of the above techniques and, and the classification criteria for each of the containers can be updated over time based on usage of the personal entry system 180. For example, the containers and their corresponding classification criteria can initially be defined according to one or more heuristic techniques, but can be updated based on how the user of the client device 110 interacts with personal entries presented responsive to a request for the personal entries.

Notably, the classification engine 131 can classify a given personal entry into multiple containers. For example, if a given personal entry is a reminder that is assigned to a user by "Mom" five minutes ago and includes content of "Get the umbrella from Mom tonight", then the given personal entry can be classified into the first container described above because it was assigned to the user five minutes ago (e.g., within the last fifteen minutes) and can also be classified into the second container described above because it includes a trigger time of "tonight" (e.g., before midnight tomorrow). In some implementations, the classification engine 131 can prune the given personal entry from a lower priority container, such that the given personal entry is only classified into a higher priority container. In the above example, the classification engine 131 may classify the reminder into the first container rather than the second container based on priority data of the containers. In other implementations, the classification engine 131 allows the given personal entry to be classified into the multiple containers. In some versions of those implementations, the given personal entry may only be "active" in one of the multiple containers at a given time. For example, if a given personal entry is a reminder that is assigned to a user by "Mom" five minutes ago and includes "Get the umbrella from Mom tonight", then the given personal entry can be classified into the first container described above because it was assigned to the user five minutes ago (e.g., within the last fifteen minutes) and also classified into the second container described above because it includes a trigger time of "tonight" (e.g., before midnight tomorrow). However, the given personal entry may only be "active" in the first container rather than the second container based on priority data of the containers.

In some implementations, each personal entry within a given container can be associated with metadata including a time-to-live ("TTL") within each container that specifies a threshold duration of time that a given personal entry is active within the given container. When the TTL for a given personal entry expires, the given personal entry can be automatically pruned from the given container. In some versions of those implementations, when a given personal entry is classified into multiple containers, the given personal entry can be pruned from a first container when a first TTL associated with the given personal entry in the first container expires, and the given personal entry can be activated in a second container with a second TTL. For example, if a given personal entry is a reminder that is assigned to a user by "Mom" five minutes ago and includes "Get the umbrella from Mom tonight" and the given personal entry is classified into both a first container (e.g., personal entries created by or assigned to the user within the last fifteen minutes) and a second container (e.g., personal entries having a trigger time within the next 24 hours), then the reminder of "Get the umbrella from Mom tonight" will be automatically pruned from the first container after a ten minute TTL lapses (e.g., based on the reminder being assigned to the given user five minutes ago and based on the first container only including reminders created by the user or assigned to the user within the last fifteen minutes). Further, once the reminder is pruned from the first container, it can be activated in the second container with a different TTL. In some other versions of those implementations, when a given personal entry is classified into multiple containers but restricted to a higher priority one of the containers, the given personal entry can be pruned from a first container when a first TTL associated with the given personal entry in the first container expires, and the classification engine 131 can re-classify the personal entry.

The ranking engine 132 can rank the containers based on priority data associated with the containers. In some implementations, the priority data associated with the containers can have an initial default ranking. For example, the priority data associated with each of the containers can indicate that a first container includes personal entries having highest priority, a second container includes personal entries having a next highest priority after the first container, a third container includes personal entries having a next highest priority after both the first container and the second container, and so on. The priority data can include, for example, one or more weights for ranking the containers, a numerical indication for an order of the containers (e.g., first, second, third, and so on), and/or other data to indicate priority for the containers. In some versions of those implementations, the initial default ranking can be updated to generate a custom ranking of the containers based on feedback from a user of the client device 110 as described herein (e.g., with respect to the feedback engine 150 and FIGS. 5A-5C).

Moreover, the ranking engine 132 can also rank personal entries within each of the containers based on priority data associated with each of the personal entries. The priority data associated with the personal entries can be based on or more ranking criteria. The ranking criteria can include, for example, personal entries having a nearest trigger time with respect to a current time, a most recent creation time with respect to a current time, a trigger location within a threshold distance with respect to a current location of the user of the client device 110, a trigger location that is visited frequently, whether the given user created the personal entry(s), whether the personal entry(s) were assigned to the user of the client device 110 by additional user(s), and/or other ranking criteria.

In some implementations, the same ranking criteria for the personal entries can be utilized across each of the containers. For example, personal entries in each of the containers can be ranked based on a creation time of the personal entry, such that the personal entries in each of the containers can be ranked according to recency of creation time. However, in some other implementations, the ranking criteria can vary for different containers. For example, personal entries classified into a first container can be ranked based on creation time of the personal entry, such that the most recently created/assigned personal entries are ranked as having highest priority (e.g., ensure the given user is aware of newly created/assigned personal entries), whereas personal entries classified into a second container can be ranked based on nearest trigger times of the personal entries, such that the trigger times that are closest to a current time are ranked as having highest priority (e.g., reminder of "call boss in two hours" may have a higher priority than "call Dad tomorrow" because the trigger time of "in two hours" is closer to a current time than "tomorrow"). Further, personal entries classified into a fourth container and a fifth containers can be ranked based on frequently/infrequently visited locations, such that personal entries having a trigger location that is infrequently visited by the given user of the computing device are ranked as having highest priority because it is less likely the given user will visit the infrequently visited location (e.g., reminder of "renew license at the DMV" may have a higher priority than "buy milk at the grocery store") without viewing the personal entry. In this manner, not only are personal entries prioritized based on containers, but the personal entries are also prioritized within each of the containers based on the ranking of the personal entries within each of the containers.

Once the ranking of the containers and the ranking of the ranking of the personal entries within each of the containers is established by the ranking engine 132, new and/or edited personal entries can be processed by the container(s) engine 130 when created by the user, edited by the user, assigned to the user by additional user(s), and/or edited by the additional user(s) that assigned a given personal entry. The new and/or edited personal entries can be classified into one or more of the containers using the classification engine 131, and the new/edit(s) engine 132A can re-rank the personal entries based on the classification of the new and/or edited personal entries. Notably, by classifying the personal entries into containers, only those containers in which the new and/or edited personal entries are classified need to be re-ranked since the personal entries in the other containers remain the same. Accordingly, in re-ranking the personal entries, only a subset of the personal entries need to re-ranked, as opposed to re-ranking all of the personal entries. For example, if a new reminder of "print off the TPS reports when I get to work" is created by a user of the client device 110 and the classification engine 131 classifies the new reminder into a first container and a fourth container, then the new/edit(s) engine 132A can be utilized to re-rank only the personal entries in the first container and the fourth container, and ignore at least a second container and a third container that remain unchanged. The handling of new and/or edited personal entries is described in more detail herein (e.g., with respect to FIG. 3).

In some implementations, the location(s) engine 132B can update priority data associated with the containers based on a current location of a user of the client device 110. The current location of the user can be determined based on sensor data generated by sensor(s) of the client device 110 of the user (e.g., based on location data generated by a GPS sensor of the client device 110). Moreover, the location(s) engine 132B can analyze the location data associated with the client device 110 to determine a user is travelling and a mode of transportation of the user (e.g., walking, jogging, running, driving, cycling, riding on a train, riding on a bus, and/or other modes of transportation). In some versions of those implementations, one or more weights associated with the ranking criteria for the containers that include location-based personal entries can be updated to indicate a higher priority for those containers. For instance, if a third container and a fourth container include location-based personal entries, then the third container and the fourth container can be promoted amongst the containers such that the priority data of the containers indicates the personal entries included in the third container and the fourth container should be given higher priority compared to personal entries in other non-location-based containers that would generally be selected prior to the personal entries in the third container and the fourth container. For example, if a user is driving home from work, as indicated by sensor data of the client device 110, and the user provides a spoken utterance of "Assistant, show me my reminders", then the location(s) engine 132B can cause location-based personal entries that are personal to the user to be rendered prior to time-based personal entries based on updating the weights of the ranking for the location-based containers.

In some additional and/or alternative implementations, the location(s) engine 132B can update priority data associated with the personal entries that include location-based triggers across each of the containers based on a current location of a user of the client device 110 to indicate a higher priority for those personal entries as compared to personal entries that include time-based triggers. For example, if a user is driving home from work, as indicated by sensor data of the client device 110 of the user and provides a spoken utterance of "Assistant, show me my reminders", and if a given container includes a first personal entry of "renew driver's license at the DMV" and a second personal entry of "buy milk at the grocery store", then priority data associated with the first and second personal entries can be updated to reflect a higher priority that non-location-based personal entries in the same container. In this example, priority data associated with the second personal entry of "buy milk at the grocery store" can indicate higher priority than the priority data associated with the first personal entry of "renew driver's license at the DMV" based on one or more factors. The one or more factors can include, for example, proximity to a location associated with the location-based personal entry, hours of operation associated with the location, and/or other factors. In this manner, personal entry(s) that are rendered audibly and/or visually via the client device 110 of the user can be dynamically updated to include personal entries that are contextually relevant to the user at any given time.

Moreover, the grouping engine 140 can process each of the ranked personal entries to generate group(s) of the ranked personal entry(s), and the group(s) can be stored in group(s) personal entry(s) database 140A. The grouping engine 140 can generate the group(s) by selecting the personal entries for inclusion in the group(s) based on priority data for each of the containers, including the ranking of the containers and the ranking of the personal entries within each of the containers. Further, the grouping engine 140 can continuously select personal entries for inclusion in the group(s) until a threshold quantity of personal entries are selected. The threshold quantity can be based on, for example, properties of a computing device (e.g., display size), pre-defined, user defined, and/or based on other information. In some implementations, the grouping engine 140 can continuously select personal entries from a given one of the containers until the given one of the containers is empty, and then proceed to select personal entries from a next non-empty, disparate container based on the ranking of the containers. Once the threshold quantity of personal entries are selected, the system can refrain from selecting additional personal entries. In some implementations, multiple subgroups can be generated in this manner, and each of the subgroups can include a subset of the threshold quantity of the personal entries.

For example, if a first container includes two personal entries, a second container does not include any personal entries, a third container includes five personal entries, a fourth container includes one personal entry, and a fifth container includes eight personal entries, and if the threshold quantity of personal entries is nine personal entries, then the grouping engine 140 can generate a first subgroup of personal entries by selecting the two personal entries of the first container and a highest ranked personal entry of the third container (i.e., skip the second container because it is empty), generate a second subgroup of personal entries by selecting the next three highest priority personal entries from the third container, and generate a third subgroup by selecting the lowest priority personal entry from the third container, the personal entry from the fourth container, and a highest priority personal entry from the fifth container. Notably, the grouping engine 140 can refrain from processing the remaining seven personal entries from the fifth container because the threshold quantity of nine personal entries has already been reached. In this manner, the grouping engine 140 can select personal entries from a plurality of disparate containers based on priority data of the containers and based on priority data of the personal entries within each of the containers.

The automated assistant 120 can cause the personal entry system 180 to transmit the group(s) of personal entries to the rendering engine 112 of the client device 110. In some implementations, the personal entry system 180 can perform the classifying, ranking, and grouping described herein in response to detecting user input requesting the personal entries, and the automated assistant 120 can cause the group(s) to be transmitted to the rendering engine 112 of the client device in response to detecting user input requesting the personal entries. In other implementations, the personal entry system 180 can perform the classifying, ranking, and grouping described herein offline (e.g., before receiving any user input requesting the personal entries), and the group(s) of personal entries can be pre-cached at the personal entry system 180 by the pre-caching engine 113B prior to receiving any request for the personal entry(s) (e.g., pre-stored in the group(s) of personal entry(s) database 140A). The automated assistant 120 can then cause the personal entry system 180 to transmit group(s) of personal entries to the rendering engine 112 of the client device 110 in response to detecting user input requesting the personal entries. In some other implementations, the personal entry system 180 can perform the classifying, ranking, and grouping described herein offline, and the group(s) of personal entries can be transmitted to the client device 110 to be pre-cached at the client device 110 by the pre-caching engine 113A prior to receiving any request for the personal entry(s) (e.g., pre-stored in one or more databases of the client device 110). The automated assistant 120 can then cause the pre-caching engine 113A to provide the rendering engine 112 with the group(s) of personal entries in response to detecting user input requesting the personal entries. In various implementations, pre-caching of personal entries can occur periodically (e.g., every few hours, every few days, and/or other time period), in response to a new and/or edited personal entry being received, and/or based on other criteria. By pre-caching the personal entries, latency in rendering the personal entries can be reduced since the classifying, ranking, and grouping of the personal entries by the personal entry system 180 need not be performed directly in response to receiving user input requesting the personal entries.

In some implementations, the user of the client device 110 can provide various forms of feedback in response to group(s) of personal entries being rendered at the client device 110. The feedback (or lack thereof) can be detected by the user interface input engine 111, and the feedback engine 150 can update priority data associated with container(s) and/or personal entries within the container(s) based on the feedback. In some versions of those implementations, the feedback can include a negative feedback signal that indicates the user of the client device 110 is not interested in a given group of personal entries rendered at the client device 110 via rendering engine 112. Thus, the feedback engine 150 can utilize the negative feedback signal to update priority data associated with one or more containers in which the personal entries of the given group are classified and/or priority data associated with the personal entries of the given group. The updated priority data can indicate a lower priority should be afforded to those containers and/or those personal entries of the given group as compared priority data associated with those containers and/or those personal entries of the given group prior to receiving the negative feedback signal.

In some versions of those implementations, the feedback can include a positive feedback signal that indicates the user of the client device 110 is interested in a given group of personal entries rendered at the client device 110 via rendering engine 112. Thus, the feedback engine 150 can utilize the positive feedback signal to update priority data associated with one or more containers in which the personal entries of the given group are classified and/or priority data associated with the personal entries of the given group. The updated priority data can indicate a higher priority should be afforded to those containers and/or those personal entries of the given group as compared priority data associated with those containers and/or those personal entries of the given group prior to receiving the positive feedback signal. Notably, in some versions of those implementations, no further user interface input can also be utilized as a positive feedback signal since it can be inferred the user of the client device 110 consumed a personal entry of interest to user in the most recently rendered group of personal entries. Accordingly, based on feedback from the user of the client device 110 in response to rendering group(s) of personal entries, the containers can be re-ranked, such that a lower priority container can be promoted in the ranking of the containers above other containers having a higher priority, and a higher priority container can be demoted in the ranking of the containers below other containers having a lower priority.

Moreover, it should be noted that each of the updates for the priority data can be weighted. In some implementations, if each personal entry in a group is classified into a same container, then the update can be weighted more heavily than if each of the personal entries in the group are classified into disparate containers. In some additional and/or alternative implementations, updates can be weighted more heavily for groups of personal entries that are presented earlier in a dialog than groups of personal entries that are presented later in the dialog. In this manner, weighted updates for rankings of containers and/or for personal entries within each of the containers can be performed without over-emphasizing the interest of the user in particular personal entries. This technique is particularly advantageous when containers having high priority data include few personal entries, whereas containers having lower prior data have a multitude of personal entries. The updating of the priority data based on various feedback signals, and the weighting thereof, is described in more detail herein with practical examples (e.g., with respect to FIGS. 5A-5C). Although the updating of the priority data based on various feedback signals, and the weighting thereof, is described herein with respect to feedback from the user of the client device 110, that is not meant to be limiting. In various implementations, feedback from a plurality of users via respective client devices can also be considered in updating the priority data for the containers. For example, if multiple users provide feedback that indicates little or no interest in personal entries from a first container but high interest in personal entries from a second container, then the priority data for the first container and the second container can be updated to indicate the second container and the personal entry(s) classified therein should be afforded higher priority than those of the first container. Thus, the priority data for the containers can be updated based on feedback from a plurality of users.

Figure 2:
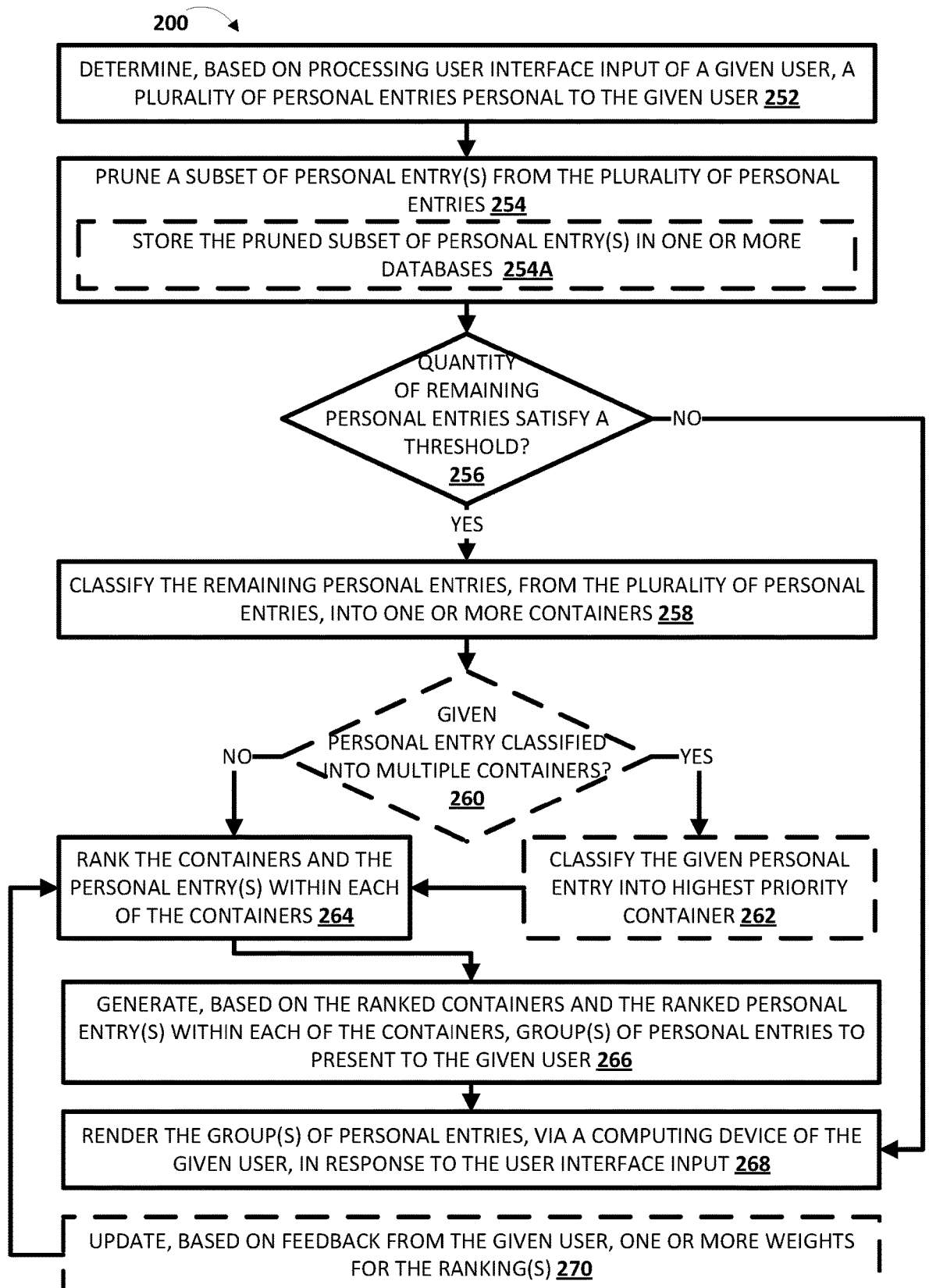
FIG. 2 depicts a flowchart illustrating an example method of determining personal entries personal to a given user to render in response to receiving a vague request for the personal entries, in accordance with various implementations.

FIG. 2 depicts a flowchart illustrating an example method 200 of determining personal entries personal to a given user to render in response to response to receiving a request for the personal entries, in accordance with various implementations. For convenience, the operations of method 200 are described with reference to a system that performs the operations. This system of method 200 includes one or more processors and/or other component(s) of a computing device (e.g., client device 110 of FIG. 1, client device 410 of FIGS. 4A-4D, computing device 510 of FIGS. 5A-5C, computing device 610 of FIG. 6, one or more servers, and/or other computing devices). Moreover, while operations of method 200 are shown in a particular order, this is not meant to be limiting. One or more operations may be reordered, omitted, or added.

At block 252, the system determines, based on processing user interface input of a given user, a plurality of personal entries personal to the given user. In some implementations, the user interface input can include a spoken utterance detected by microphone(s) of a computing device of the given user. Further, audio data that captures the spoken utterance can be processed to determine that the spoken utterance includes a request for the personal entries. In some versions of those implementations, the spoken utterance may be a vague request personal entries that are of a particular type (e.g., reminders, lists, calendar entries, and/or other types) that does not specify any additional features (e.g., created by the user, assigned to the user, trigger time, trigger location, creation time, and/or other features) of the personal entries that are in addition to the particular type. For example, the audio data may capture a spoken utterance of "Show me my calendar entries" without specifying a day and/or time associated with any calendar entry. In some other versions of those implementations, the spoken utterance the spoken utterance may request personal entries that are of a particular and specify additional features of the personal entries that are in addition to the type. For example, the audio data may capture a spoken utterance of "Show me my calendar entries for today" that specifies a temporal feature of "today". In some other implementations, the user interface input can include a typed and/or touch input directed at a graphical user interface of a computing device of the given user. The typed and/or touch input can be processed to determine that the typed and/or touch input includes a request for the personal entries, and the request can be processed in a similar manner as described above with respect to processing the request included in the spoken utterance.

At block 254, the system prunes a subset of personal entry(s) from the plurality of personal entries. In some implementations, the pruning of the personal entries can be an optional pre-processing step. The system can determine the subset of personal entry(s) to prune based on one or more pruning criteria. The pruning criteria can include, for example, temporal criteria based on a trigger time and/or creation time associated with a given personal entry, locational criteria based on a trigger location associated with a given personal entry, completion criteria, and/or other criteria. For example, if a given personal entry is a reminder that is marked as done or a past calendar entry, then those reminder(s) and/or calendar entries can be pruned from the personal entries based on the completion criteria. As another example, if a given personal entry is a reminder that is long overdue (e.g., stale reminder), then those reminder(s) can be pruned from the personal entries based on the temporal criteria. By pruning a subset of personal entry(s) from the plurality of personal entries, the system need only process only those personal entries that are relevant to a user, thereby conserving computational and/or network resources that would otherwise be wasted processing personal entries that are not relevant to the user. In some versions of those implementations, the method 200 can also include optional sub-block 254A. If included, at optional sub-block 254A, the system can store the pruned subset of personal entries in one or more databases (e.g., in pruned personal entry(s) database 131A of FIG. 1). Moreover, the subset of pruned personal entries can be associated with priority data that is indicative of a lowest priority and/or be classified into a lowest priority container by default.

At block 256, the system determines whether a quantity of remaining personal entries satisfies a threshold. The threshold can be a quantity threshold and can be based on a quantity of personal entries that will be rendered for presentation to the user via one or more groups, a defined quantity of personal entries, and/or other quantity thresholds. If, at an iteration of block 256, the system determines that the quantity of remaining personal entries does not satisfy a threshold, then the system can proceed to block 268 and render the remaining personal entries as a group of personal entries, via a computing device of the given user, in response to user interface input requesting the personal entries. In some implementations, the given user may only have a handful of personal entries that are of the particular type requested by the user that are personal to the given user. In some versions of those implementations, each of the personal entries can be rendered at the computing device of the given user without any further processing of the personal entries since each of the personal entries will be rendered for presentation to the user via one or more of the groups. By rendering these personal entries for presentation to the user without further processing, the system may conserve computational and/or network resources that would otherwise be wasted in the further processing personal entries that are likely to be rendered for presentation to the user regardless of any further processing.

If, at an iteration of block 256, the system determines that the quantity of remaining personal entries satisfies the threshold, then the system can proceed to block 258. At block 258, the system classifies the remaining personal entries, from the plurality of personal entries, into one or more containers. The remaining personal entries can be classified based on one or more classification criteria. The one or more classification criteria can include, for example, personal entries having a trigger time within a threshold range of time with respect to a current time, a creation time within a threshold range of time with respect to a current time, a trigger location, a trigger location within a threshold distance with respect to a current location of the given user of the computing device, whether the given user created the personal entry(s), whether the personal entry(s) were assigned to the given user of the computing device by an additional user, and/or other criteria. For example, personal entries that were created by the given user and/or assigned to the given user within the last fifteen minutes can be classified into a first container regardless of trigger time and/or trigger location, personal entries having a trigger time between eight hours ago and midnight tomorrow can be classified into a second container, personal entries having a trigger time between midnight tomorrow but within the next week can be classified into a third container, personal entries having a trigger location that are assigned to the user more than fifteen minutes ago can be classified into a fourth container, personal entries having a trigger location that are created by the user more than fifteen minutes ago can be classified into a fifth container, and so on. In this manner, the personal entries can be dynamically classified into one or more containers based on various classification criteria.

The method 200 can also include optional block 260 and optional block 262. If included, at optional block 260, the system may determine whether a given personal entry is classified into multiple containers. A given personal entry can be classified into multiple containers based on the above classification criteria. Continuing with the above example, if a given personal entry is a reminder that is assigned to a user by "Mom" five minutes ago and includes "Get the umbrella from Mom tonight", then the given personal entry can be classified into the first container because it was assigned to the user five minutes ago (e.g., within the last fifteen minutes) and also classified into the second container because it includes a trigger time of "tonight" (e.g., before midnight tomorrow). If, at an iteration of optional block 260, the system determines that a given personal entry is classified into multiple containers, then the system may proceed to block optional block 262. At optional block 262, the system may classify the given personal entry into the highest priority container of the multiple containers. Continuing with the above example, the reminder of "Get the umbrella from Mom tonight" would be classified into the first container to indicate a higher priority, rather than the second container having a lower priority than the first container. By classifying newly created and/or assigned personal entries into the higher priority container, the system ensures that the given user can quickly and efficiently access new personal entries, thereby reducing user interface inputs and conserving computational resources by preventing the user from having to navigate through various interfaces to view these new personal entries. From optional block 262, the system may proceed to block 264. If, at an iteration of optional block 260, the system determines that a given personal entry is not classified into multiple containers, then the system may proceed to block 264.

If the system does not include optional block 260 and optional block 262, then the system may proceed directly from block 258 to block 264 and bypass optional block 260 and optional block 262. In some implementations, it may be desirable to omit optional block 260 and optional block 262.

In some versions of those implementations, each personal entry within a given container can be associated with metadata, such as a time-to-live ("TTL") within each container that specifies a threshold duration of time that a given personal entry is active within the given container. When the TTL for a given personal entry lapses, the given personal entry can be automatically pruned from a given container and classified into another container. Moreover, in some further versions of those implementations, a TTL may also include a start time, such that a personal entry is only "active" in one container at a time. Continuing with the above example, the reminder of "Get the umbrella from Mom tonight" will be automatically pruned from the first container after a ten minute TTL lapses (e.g., based on the reminder being assigned to the given user five minutes ago and based on the first container only including reminders created by the user or assigned to the user within the last fifteen minutes). Once the reminder is pruned from the first container, it must then be classified into another container and ranked within that container. However, if the reminder is already classified and ranked in another one of the containers, then the system does not need to re-classify and re-rank the reminder of "Get the umbrella from Mom tonight" into another container because it was already ranked and classified in a container in which it is "active" after being pruned from the first container. Thus, when the TTL lapses for the reminder, the reminder can be pruned from the first container, and the system need not further process the reminder. It should be noted that the given personal entry can also be associated with metadata for multiple TTLs based on corresponding containers the given personal entry is classified, thereby preventing the system from having to annotate the reminders with another TTL.

At block 264, the system ranks the containers and the personal entries within each of the containers. The system can utilize a default ranking of the containers. For example, the containers can be structured such that a first container includes personal entries having highest priority, a second container includes personal entries having a next highest priority, and so on. In some implementations described herein, the containers can be re-ranked based on one or more feedback signals from the given user of the computing device. Further, the system can rank the personal entries within a given container based on or more ranking criteria. The one or more ranking criteria can include, for example, personal entries having a nearest trigger time with respect to a current time, a most recent creation time with respect to a current time, a trigger location within a threshold distance with respect to a current location of the given user of the computing device, a trigger location that is visited frequently, whether the given user created the personal entry(s), whether the personal entry(s) were assigned to the given user of the computing device by an additional user, and/or other criteria. In some implementations, the same ranking criteria can be utilized for each of the containers. However, in some other implementations, the ranking criteria can vary for different containers. Continuing with the above example, personal entries classified into the first container can be ranked based on creation time of the personal entry, such that the most recently created/assigned personal entries are ranked as having highest priority (e.g., ensure the given user is aware of newly created/assigned personal entries), whereas personal entries classified into the second container can be ranked based on trigger time of the personal entry, such that the trigger times that are closest to a current time are ranked as having highest priority (e.g., reminder of "call boss in two hours" may have a higher priority than "call Dad tomorrow" because a trigger time is closer to a current time). Further, personal entries classified into the fourth and fifth containers can be ranked based on frequently/infrequently visited locations, such that personal entries having a trigger location that is infrequently visited by the given user of the computing device are ranked as having highest priority because it is less likely the given user will visit the infrequently visited location (e.g., reminder of "renew license at the DMV" may have a higher priority than "buy milk at the grocery store") without viewing the personal entry. In this manner, not only are personal entries prioritized based on containers, but the personal entries are also prioritized within each of the containers based on the ranking of the personal entries within each of the containers.

At block 266, the system generates, based on the ranked containers and the ranked personal entries within each of the containers, group(s) of personal entries to present to the given user. In some implementations, the system can select the personal entries for inclusion in the group(s) based on priority data for each of the containers, including the ranking of the containers and the ranking of the personal entries within each of the containers. The system can continuously select personal entries for inclusion in the group(s) until a threshold quantity of personal entries are selected. The threshold quantity can be based on, for example, properties of a computing device (e.g., display size), pre-defined, user defined, and/or based on other information. In some versions of those implementations, the personal entries can be continuously selected from a given container until the given container is empty, and then proceed to select personal entries from a next non-empty, disparate container. Once the threshold quantity of personal entries are selected, the system can refrain from selecting additional personal entries. In some versions of those implementations, multiple subgroups can be generated and each of the subgroups can include a subset of the threshold quantity of the personal entries. For example, if the threshold quantity of personal entries is nine personal entries, then nine personal entries can be selected from one or more of the containers as being of a highest priority, and three groups that each include three of the personal entries can be generated.

At block 268, the system renders the group(s) of personal entries, via a computing device of the given user, in response to the user interface input. The group(s) of the personal entries can be rendered visually and/or audibly at the computing device of the given user (e.g., as described with respect to FIGS. 4A-4D and 5A-5C). In implementations where the system generates multiple groups, a first group of the multiple groups can be rendered at the computing device of the given user and the remaining groups can be withheld from rendering until further user interface input is detected at the client device requests further personal entries be presented. When further user interface input requesting further personal entries be presented, a second group of the multiple groups can be rendered at the computing device of the given user and the remaining groups can be withheld from rendering until yet further user interface input is detected at the client device requests yet further personal entries be presented. In this manner, the system can iteratively provide personal entries according to the priority data for the personal entries included in the group, and further personal entries can be withheld from rendering at the client device until the further personal entries are requested by the given user of the computing device. In implementations where the quantity of remaining personal entries did not satisfy a threshold (e.g., from block 256), the system can further divide the personal entries into subgroups based on the quantity of personal entries. For example, if the quantity of remaining personal entries is six personal entries, then the six personal entries can be divided into two subgroups. However, if the quantity of remaining personal entries is two personal entries, then there is no need to divide the two personal entries into two subgroups. By iteratively providing personal entries of the given user via groups, computational resources can be conserved by obviating the need to render each personal entry. For example, if the given user desires to only view the first personal entry, then the system can conserve computational resources since the system need not render personal entries beyond the first group. Moreover, these techniques are particularly advantageous when a computing device has limited screen real estate since the user can consume each group of personal entries without having the scroll through a user interface that includes a plurality of personal entries to identify a particular personal entry.

The system may include optional block 270. If included, at optional block 270, the system may update, based on feedback from the given user, one or more weights for the ranking at block 264. The feedback from the given user can be detected at the computing device in response to the rendering group(s) of personal entries. In some implementations, the feedback can be an indication from the given user of the computing device detected in response to a group and/or subgroup indicating that the automated assistant should not present any further personal entries (e.g., explicit feedback such as "stop" or implicit feedback based on no further user input). For example, if a first group includes two personal entries from a first container and a single personal entry from a second container and further user interface input of "stop" is detected at the computing device of the given user, then respective weights associated with the first container and the second container can be updated to indicate a higher priority should be afforded to the first container and the second container. However, if further user interface input of "next" is detected at the computing device of the given user, then respective weights associated with the first container and the second container can be updated to indicate a lower priority should be afforded to the first container and the second container. Moreover, if yet further user interface input of "stop" is detected at the computing device when a subsequent group or subgroup is rendered at the computing device, then respective weights associated with containers of the personal entries rendered in the subsequent group or subgroup can be updated to indicate a higher priority should be afforded to the those associated containers. In yet other implementations, the feedback from the given user of the computing device can identify a particular personal entry of interest to the given user (e.g., "the first one", "the third one", and so on), or infer a particular personal entry of interest to the user (e.g., the given user interrupts rendering of the personal entries subsequent to the particular personal entry being rendered), and respective weights for the container associated with the particular personal entry can be updated to indicate a higher priority should be afforded to the associated container. In this manner, the ranking of the containers and personal entries classified within those containers can be dynamically updated and tailored to the given user of the computing device.

Figure 3:
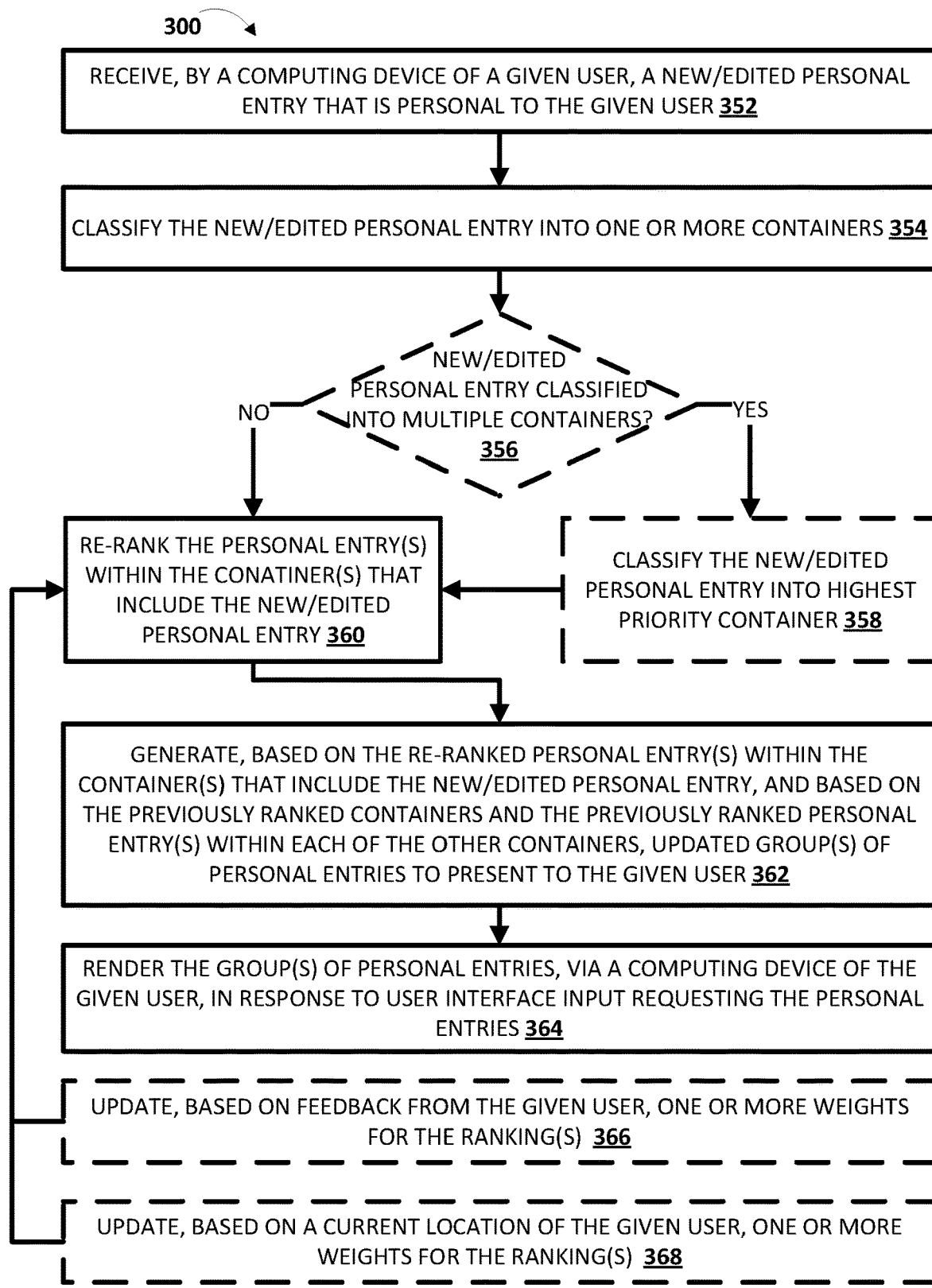
FIG. 3 depicts a flowchart illustrating an example method of updating containers in response to response to receiving a new or edited personal entry, in accordance with various implementations.

FIG. 3 depicts a flowchart illustrating an example method 300 of updating containers in response to response to receiving a new or edited personal entry, in accordance with various implementations. For convenience, the operations of method 300 are described with reference to a system that performs the operations. This system of method 300 includes one or more processors and/or other component(s) of a computing device (e.g., client device 110 of FIG. 1, client device 410 of FIGS. 4A-4D, computing device 510 of FIGS. 5A-5C, computing device 610 of FIG. 6, one or more servers, and/or other computing devices). Moreover, while operations of method 300 are shown in a particular order, this is not meant to be limiting. One or more operations may be reordered, omitted, or added. Further, the method 300 assumes that personal entries that are personal to the user have already been classified into containers, the containers have been ranked, and the personal entries within each of the containers have been ranked (e.g., as described with respect to FIG. 2). Thus, for the sake of example, the method 300 of FIG. 3 focuses on handling new or edited personal entries.

At block 352, the system receives, by a computing device of a given user, a new or edited personal entry that is personal to the given user. The new or edited personal entry can be created or edited by the user, or assigned to the user by an additional user or edited by the additional user. For example, the given user can invoke an automated assistant and provide a spoken utterance of "Assistant, remind me to walk the dog after work". Based on the spoken utterance, the automated assistant can create a new reminder of "Walk the dog after work" for the given user. As another example, assume the given user's boss initially assigns, to the given user, a task of "submit TPS reports on Monday", but subsequently edits the task entry to include "submit TPS reports on next Monday". Although the task entry may already have been classified into a container and ranked within the container, it may be advantageous to treat the edited task entry of "submit TPS reports on next Monday" as a new personal entry, such that the edited task entry can be re-classified and re-ranked. In some implementations, when a given personal entry is edited, the original personal entry can be pruned from one or more containers. Continuing with the above example, when the given user's boss updates the task entry to include "submit TPS reports on next Monday", the original task entry of "submit TPS reports on Monday" can be pruned from an associated container.

At block 354, the system classifies the new or edited personal entry into one or more containers. The system can classify the new or edited personal entry into one or more of the containers in the same manner described with respect to block 258 of FIG. 2. The method 300 can also include optional block 256 and optional block 258. If included, at optional block 356, the system may determine whether the new or edited personal entry is classified into multiple containers. The system can determine whether the given the new or edited personal entry is classified into multiple containers in the same manner described with respect to block 260 of FIG. 2. If, at an iteration of optional block 356, the system determines that the new or edited personal entry is classified into multiple containers, then the system may proceed to block optional block 358. At optional block 358, the system may classify the new or edited personal entry into the highest priority container of the multiple containers. The system can classify the new or edited personal entry into the highest priority container of the multiple containers in the same manner described with respect to block 262 of FIG. 2. From optional block 358, the system may proceed to block 360. If, at an iteration of optional block 260, the system determines that the new or edited personal entry is not classified into multiple containers, then the system may proceed to block 360.

If the system does not include optional block 356 and optional block 358, then the system may proceed directly from block 354 to block 360 and bypass optional block 356 and optional block 358. As described above with respect to FIG. 2, in some implementations, it may be desirable to omit optional block 356 and optional block 358.

At block 360, the system re-ranks personal entries within the container(s) that include the new/edited personal entry.

In some implementations, and in contrast with the initial ranking at block 264 of FIG. 2, the system may only re-rank personal entries within the container(s) that include the new/edited personal entry, as opposed to re-ranking any previously ranked containers and/or any personal entries in other container(s) where the new/edited personal entry was not classified. The system can re-rank the personal entries within the container(s) based on or more ranking criteria. The one or more ranking criteria can include, for example, personal entries having a nearest trigger time with respect to a current time, a most recent creation time with respect to a current time, a trigger location within a threshold distance with respect to a current location of the given user of the computing device, a trigger location that is visited frequently, whether the given user created the personal entry(s), whether the personal entry(s) were assigned to the given user of the computing device by an additional user, and/or other criteria. In some implementations, the same ranking criteria can be utilized for each of the containers. However, in some other implementations, the ranking criteria can vary for different containers. For example, assume a new personal entry is classified into both a first container and a fourth container, the personal entries in the first container and the fourth container can be re-ranked according to respective ranking criteria without having to re-rank any personal entries within the second container, the third container, or any other containers. Further, the containers themselves need not be re-ranked. As another example, assume an edited personal entry is an original reminder and a trigger time of the original reminder is edited, thereby resulting in an edited reminder. Based on the edited trigger time of the edited reminder, the edited reminder may be reclassified into a new container, and the personal entries in the new container can be re-ranked to include the edited reminder. In this example, it should be understood that the original reminder can be pruned from an original container that included the original reminder, thereby affecting the ranking of the original container, but the original reminder can be "dropped out", such that any other personal entry subsequent to the original reminder can be "moved up" without the system having to actively re-rank the personal entries in the original container.

At block 362, the system generates, based on the re-ranked personal entries within the container(s) that include the new/edited personal entry, and based on the previously ranked containers and the previously ranked personal entries within each of the other containers, updated group(s) of personal entries to present to the given user. In some implementations, the system can select the personal entries for inclusion in the group(s) based on priority data for each of the containers, including the previously determined ranking of the containers, the re-ranking of the personal entries within the container(s) that include the new/edited personal entry, and the previously determined ranking of the personal entries within each of the other containers. The system can continuously select the personal entries for inclusion in the group(s) until a threshold quantity of personal entries are selected in the same manner described with respect to block 266 of FIG. 2, but also take into consideration the re-ranking of the personal entries with container(s) that include the new/edited personal entry.

At block 364, the system renders the group(s) of personal entries, via a computing device of the given user, in response to user interface input requesting the personal entries. The system can render the group(s) of the personal entries in response to the user interface input requesting the personal entries in the same manner as described with respect to block 268 of FIG. 2.

The system may include optional block 366. If included, at optional block 366, the system may update, based on feedback from the given user, one or more weights for the ranking at block 360. The system can update one or more of the weights for the ranking in the same manner as described with respect to block 270 of FIG. 2. The updating of the one or more weights for the ranking is described in more detail herein (e.g., with respect to feedback engine 150 of FIG. 1, and FIGS. 5B and 5C).

Further, the system may include optional block 368. If included, at optional block 368, the system may update, based on a current location of the given user, one or more weights for the ranking at block 360. The current location of the given user can be determined based on sensor data generated by sensor(s) of the computing device of the given user (e.g., based on location data generated by a GPS sensor). Moreover, the system can analyze the location data associated with the computing device of the given user to determine a user is travelling and a mode of transportation of the given user (e.g., walking, jogging, running, driving, cycling, riding on a train, riding on a bus, and/or other modes of transportation). In some implementations, one or more weights associated with the ranking criteria for the containers that include location-based personal entries can be updated to indicate a higher priority for those containers. For instance, if a third container and a fourth container include location-based personal entries, then the third container and the fourth container can be promoted amongst the containers such that priority data indicates the personal entries included in the third container and the fourth container should be selected for inclusion in updated group(s) generated at block 362 prior to personal entries in other containers that would generally be selected prior to the personal entries in the third container and the fourth container. As an example, if a given user is driving home from work, as indicated by sensor data of the computing device of the given user, and provides a spoken utterance of "Assistant, show me my reminders", then the system can provide location-based personal entries that are personal to the user prior to time-based personal entries based on updating the weights of the ranking. In some additional and/or alternative implementations, one or more weights associated with the ranking criteria for the personal entries that include a trigger location across each of the containers can be updated to indicate a higher priority for those personal entries. For example, if a given user is driving home from work, as indicated by sensor data of the computing device of the given user, and provides a spoken utterance of "Assistant, show me my reminders" and if a given container includes a first personal entry of "renew driver's license at the DMV" and a second personal entry of "buy milk at the grocery store", then priority data associated with the first and second personal entries can reflect a higher priority that non-location-based personal entries in the same container. In this example, priority data associated with the second personal entry of "buy milk at the grocery store" can indicate higher priority than the priority data associated with the first personal entry of "renew driver's license at the DMV" based on one or more factors. The one or more factors can include, for example, proximity to a location associated with the location-based personal entry, hours of operation associated with the location, and/or other factors. In this manner, personal entry(s) that are rendered audibly and/or visually via the computing device of the given user can be dynamically updated to include personal entries that are contextually relevant to the given user at any given time.

Referring now to FIGS. 4A-4D, various non-limiting examples of a user of a computing device 410 interacting with an automated assistant (e.g., automated assistant 120 of FIG. 1) to obtain personal entries that are personal to the user of the computing device 410 are described. FIGS. 4A-4D each depict a computing device 410 with a portion of a graphical user interface 440 displaying examples of interactions (e.g., dialog) between a user of the computing device 410 and an automated assistant according to implementations disclosed herein. One or more aspects of the automated assistant may be implemented locally on the computing device 410 and/or on one or more computing devices that are in network communication with the computing device 410 in a distributed manner (e.g., via network(s) 190 of FIG. 1). Although the computing device 410 of FIGS. 4A-4D is depicted as a mobile phone, it should be understood that is not meant to be limiting. The computing device 410 can be, for example, a stand-alone speaker, a speaker connected to a graphical user interface, a laptop, a desktop computer, and/or any other computing device capable of executing an automated assistant. Moreover, although the dialog of FIGS. 4A-4D is depicted as a text-based conversation between the user and the automated assistant that is not meant to be limiting. It should be understood that the dialog can additionally and/or alternatively be rendered audibly via one or more speakers of the computing device 510 as described with respect to FIGS. 4A-4D.

The graphical user interface 440 of FIGS. 4A-4D further includes a textual reply interface element 484 that the user may select to generate user interface input via a virtual keyboard or other touch and/or typed input, and a voice reply interface element 485 that the user may select to generate user interface input via a microphone of the computing device 410. In some implementations, the user may generate user interface input via the microphone without selection of the voice reply interface element 485. For example, during the dialog, active monitoring for audible user interface input via the microphone may occur to obviate the need for the user to select the voice reply interface element 485. In some of those and/or in other implementations, the voice reply interface element 485 may be omitted. Moreover, in some implementations, the textual reply interface element 484 may additionally and/or alternatively be omitted (e.g., the user may only provide audible user interface input). The graphical user interface 440 of FIGS. 4A-4D also includes system interface elements 481, 482, 483 that may be interacted with by the user to cause the computing device 410 to perform one or more actions.

As described herein (e.g., with respect to FIG. 1), the automated assistant can determine an initial superset of personal entries that are responsive to user input requesting the personal entries. Notably, the personal entries described herein can be assigned to a particular type. The particular type of personal entries can include, for example, reminders, lists, calendar entries, task entries, notes, text messages, SMS messages, email, and/or other types personal entries created by a user, assigned to a user, and/or otherwise associated with a user. Moreover, although FIGS. 4A-4D are described herein with respect to personal entries being reminders, that is for the sake of example and is not meant to be limiting.

Moreover, the personal entries described herein can include additional features. The additional features can include, for example, personal entries created by a user, personal entries assigned to a user, work personal entries of the user, personal entries associated with a particular day or time, personal entries associated with a particular location, and/or other types of personal entries. Further, a given personal entry can be associated with various additional features. For example, if a user creates a personal entry of "Remind me to email Boss when I get to work tomorrow", then the personal entry can be associated with a first additional feature of created by the user and a second additional features of work location.

In some implementations, the user input requesting personal entries can include a detailed request specifying a particular type of personal entries and additional features for the personal entries. For example, the user input can include "Show me task entries assigned to me by other users", and the automated assistant can restrict personal entries presented only to the user to task entries that are assigned to the user by other users. In some other implementations, the user input requesting personal entries can include a vague request specifying only a type of personal entries. For example, the user input can include "Show me task entries" without any additional features, and the automated assistant will broadly search through all task entries of the user. Although the techniques described herein are directed to handling these vague requests (e.g., the user requests personal entries without specifying any additional features of the personal entries), it should be understood that is for the sake of example and is not meant to be limiting. For example, the techniques described herein can also be utilized to determine a group of personal entries to present to a user when additional features of the personal entries are specified in user input detected at the computing device 410.

In some implementations, a subset of personal entries can be pruned from the initial superset of personal entries as a pre-processing step based one or more pruning criteria. The pruning criteria can include, for example, completion criteria, temporal criteria based on a trigger time and/or creation time associated with a given personal entry, locational criteria based on a trigger location associated with a given personal entry, and/or other criteria. For example, if a given personal entry is a reminder that is marked as done, then those reminder(s) can be pruned from the superset of personal entries based on a completion criteria. As another example, if a given personal entry is a reminder that is long overdue (e.g., stale reminders), then those reminder(s) can be pruned from the initial superset of personal entries based on a temporal criteria. In some versions of those implementations, the remaining personal entries in the super set of personal entries can be classified into one or more containers, and the personal entries can be ranked within each of the containers. These containers enable personal entries to be represented as a hierarchy of personal entries based on those that are temporally and/or locationally relevant to a user of the computing device 410.

In some further versions of those implementations, personal entries can be selected for inclusion in a group based on priority data for the personal entries until a threshold quantity of personal entries are selected for inclusion in the group. Put another way, personal entries can be continuously selected from a highest priority container that includes personal entries until each of the personal entries in the first highest priority container have been selected, then personal entries from a next highest priority container that includes personal entries until each of the personal entries in the next highest priority container are selected, and so on until a threshold quantity of personal entries is reached. Further, the order the personal entries are selected within each of the containers can be based on the ranking of the personal entries within each of the containers. By selecting personal entries in this manner, a group of personal entries can be divided into multiple subgroups. The subgroups can be, for example, divided evenly such that each of the subgroups include the same number of personal entries, divided by containers such that each of the subgroups only include personal entries from a particular container, and/or other techniques for dividing a group into subgroups. For example, if a first container includes two personal entries, a second container includes three personal entries, and a third container includes two personal entries, then a first subgroup of personal entries can include the two personal entries of the first container and a highest ranked personal entry of the second container, a second subgroup of personal entries can include the other two personal entries of the second container and a highest ranked personal entry of the third container, and so on. As another example, the first subgroup can include only the two personal entries from the first container, the second subgroup can include only the three personal entries from the second container, and so on. In this manner, the automated assistant can select personal entries from a plurality of disparate containers based on priority data of the containers and priority data of the personal entries within each of the containers.

Although FIGS. 4A-4D are described herein as including particular containers and personal entries from particular containers, that is for the sake of example and is not meant to be limiting. It should be understood that the personal entries may depend on personal entries that are created by a user, assigned to a user, and/or otherwise associated with a user, and the containers to which those personal entries are classified. Moreover, it should be understood that some containers may include personal entries, whereas other containers may not include any personal entries (e.g., empty containers).

In some implementations, the automated assistant can cause the computing device 410 to sequentially render the personal entries included in the group of personal entries. In some versions of those implementations, the automated assistant can cause the computing device 410 to audibly render the personal entries in the group of personal entries one after the other (e.g., via speaker(s) of the computing device 410) until each personal entries have been audibly rendered for consumption by a user of the computing device 410. The computing device can process, using text-to-speech model(s), text of a given personal entry (and/or phonemes corresponding to the text of the given personal entry) to generate synthesized speech audio data that include synthesized speech for the given personal entry. In some further versions of those implementations, the automated assistant can cause one or more earcons to be audibly rendered between each personal entry in a group. For example, after audibly rendering a first personal entry of the group, the automated assistant can cause the computing device 410 to beep or provide any other audible indication that the automated assistant is transitioning between personal entries in the group. In some further versions of those implementations, the automated assistant can associate a number with each of the personal entries, and can, if the number subsequently captured in an additional spoken utterance of the user, cause the automated assistant to surface the personal entry associated with the number. For example, if a first personal entry is associated with "one" or "first", and a user of the computing device 410 cycles through multiple groups of personal entries prior to saying "Return to the first one", then the automated assistant can cause the personal entry associated with "first" to supplant any other personal entries that are currently displayed on the graphical user interface 440 of the client device 410. In some versions of those implementations, the automated assistant can additionally and/or alternatively cause the computing device 410 to visually render the personal entries in the group (e.g., via the graphical user interface 440 of the computing device 410). In some further versions of those implementations, the automated assistant can cause a given personal entry to be graphically demarcated as it is being audibly rendered by the computing device 410 and/or cause the graphical user interface 440 to scroll along with personal entries as they are rendered. For example, the automated assistant can cause a group of personal entries to be visually rendered at the graphical user interface 440 of the client device 410 in response to receiving a vague user request for personal entries, and, as a given one of the personal entries is being audibly rendered, the given personal entry can be highlighted, underlined, bolded, displayed more prominently, and/or otherwise graphically demarcated on the graphical user interface 440.

Figure 4A:
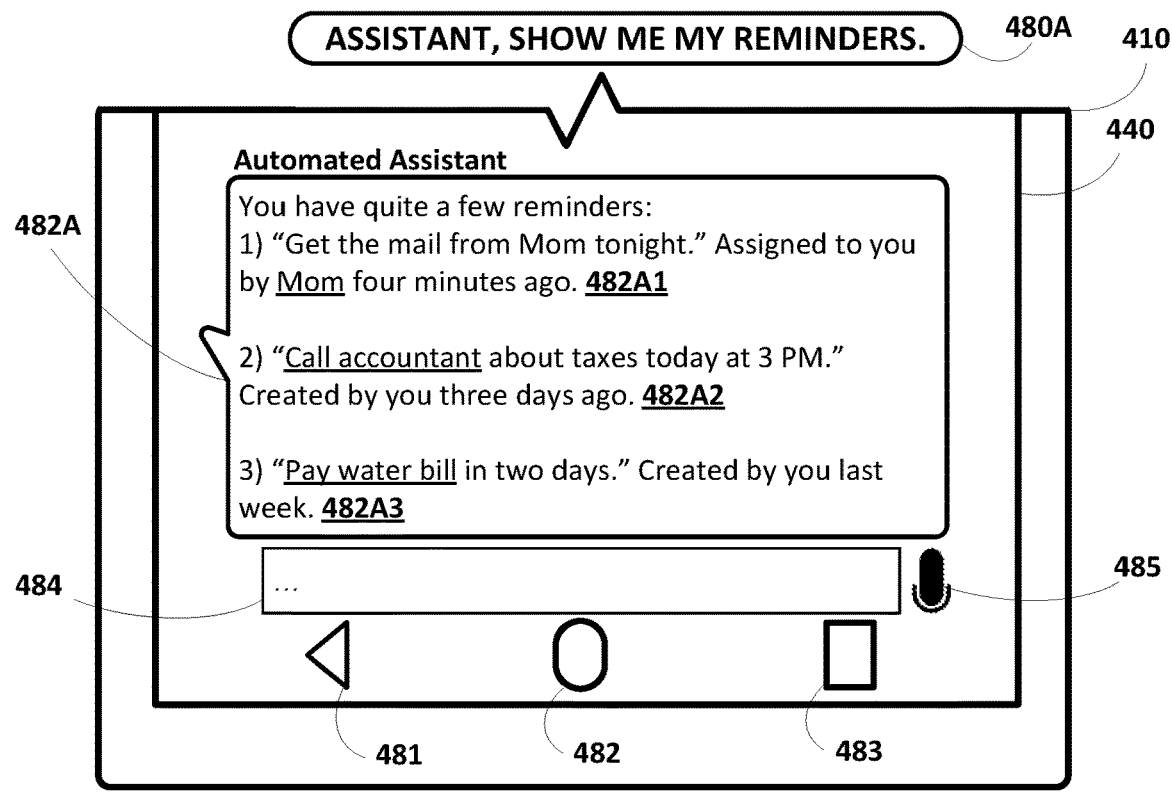
FIGS. 4A, 4B, 4C, and 4D depict various non-limiting examples of a given user of a computing device interacting with an automated assistant to obtain personal entries responsive to a vague request for the personal entries, in accordance with various implementations.

For example, as shown in FIG. 4A, the computing device 410 detects (e.g., using user interface engine 111 of FIG. 1) user input 480A that includes a vague request of "Assistant, show me my reminders" without specifying any additional features of the reminders. In some implementations, the user input 480A can be a spoken utterance of the user of the computing device 410 detected via microphone(s) of the computing device 410. In some versions of those implementations, audio data that captures the spoken utterance can be processed, using speech recognition model(s), locally on the computing device 410 and/or remotely at additional computing device(s) in communication with the computing device 410 to generate recognized text. In some further versions of those implementations, the recognized text can be visually rendered on the graphical user interface 440 as part of the dialog. In some implementations, the user input 480A can be typed input (e.g., in response to selection of the textual reply interface element 484) and/or touch input (e.g., in response to selection of a graphical element visually rendered on the graphical user interface 410) directed to the graphical user interface 440 of the computing device 410. In some versions of those implementations, text corresponding to the typed input and/or touch input can be visually rendered on the graphical user interface 440 as part of the dialog. Moreover, text corresponding to the user input (e.g., recognized text generated using speech recognition model(s) and/or text based on typed and/or touch input) can be processed, using natural language understanding model(s), to determine an intent of the user, and the automated assistant can determine personal entry(s) that are responsive to the user input by identifying personal entries that satisfy the intent (e.g., reminders of the user of the computing device 410 in FIGS. 4A-4D).

The automated assistant can access, in response to receiving the user input 480A of "Assistant, show me my reminders", access one or more databases that include personal entry(s) responsive the user input 480A (e.g., one or more databases that include a plurality of reminder). Further, the automated assistant can determine an initial superset of reminders from the reminders included in the database, prune a subgroup of the reminders from the initial superset of the reminders, classify each of the remaining reminders in the initial superset into one or more containers, rank the one or more containers, and rank the personal entries within each of the containers. For example, assume the automated assistant determines an initial superset of 100 reminders, but that 20 of the reminders are either marked as done or are stale reminders. In this example, the automated assistant can prune the subset of 20 reminders from the initial superset of 100 reminders, thereby resulting in 80 reminders for classification. The automated assistant can then classify each of the 80 reminders into one or more containers, rank the one or more containers, and rank the personal entries within the one or more containers. Further, the automated assistant can then select, from the remaining 80 reminders, a group of reminders by continuously selecting, based on the ranking of the one or more containers, a highest priority non-empty container, as indicated by priority data of the containers, to begin selecting personal entries for inclusion in a group to be presented to the user of the computing device 410. The automated assistant can continuously select the personal entries from the non-empty container, as indicated by priority data of the personal entries, until the non-empty container is empty or a threshold quantity of personal entries are selected. If each of the personal entries from the non-empty container are selected (e.g., the non-empty container becomes empty) prior to reaching the threshold quantity of personal entries, then the automated assistant can begin selecting personal entries from a next non-empty container, as indicated by priority data, until the next non-empty container is empty or a threshold quantity of personal entries are selected, and so on from each of the containers until the threshold quantity of personal entries is reached. Once the threshold quantity of personal entries are selected, the automated assistant can refrain from selecting additional personal entries regardless of how many personal entries remain in a current container from which personal entries are being selected.

Moreover, the automated assistant can cause the computing device 410 to visually render a first group of personal entries 482A on the graphical user interface 440 in response to receiving the user input 480A. In some implementations, the automated assistant can additionally and/or alternatively cause the computing device 410 to audibly render the first group of personal entries 482A via speaker(s) of the computing device 410. As shown in FIG. 4A, the first group of personal entries 482A indicates that "You have quite a few reminders" to the user of the computing device 410, and includes the following personal entries: a first personal entry 482A1 of "Get the mail from Mom tonight" that was assigned to the user of the computing device 410 by "Mom" four minutes prior to receiving the user input 480A; a second personal entry 482A2 of "Call account about taxes today at 3 PM" that was created by the user of the computing device 410 three days prior to receiving the user input 480A; and a third personal entry 482A3 of "Pay water bill in two days" that was created by the user of the computing device 410 by "Mom" a week prior to receiving the user input 480A.

In some implementations, the first personal entry 482A1, the second personal entry 482A2, and the third personal entry 482A3 can each be classified into one or more containers. In some implementations, the personal entries can be visually and/or audibly rendered at the computing device 410 based on a ranking of the containers. For example, assume a first container has temporal criteria for classification that indicates all reminders created by the user or assigned to the user within the past ten minutes should be classified into the first container regardless of a time trigger or location trigger associated with the personal entry, assume a second container has temporal criteria for classification that indicates all reminders having a trigger time within the next 24 hours that were not created by the user or assigned to the user within the past ten minutes should be classified into the second container, and assume a third container has temporal criteria for classification that indicates all reminders having a trigger time within the next 24-48 hours that were not created by the user or assigned to the user within the past ten minutes should be classified into the third container. In this example, the first personal entry 482A1 would be classified into the first container based on it being assigned to the user less than ten minutes ago, the second personal entry 482A2 would be classified into the second container based on a trigger time of 3 PM occurring within the next 24 hours and based on the second personal entry 482A2 being created more than ten minutes ago, and the third personal entry 482A3 would be classified into the third container based on a trigger time of two days occurring within the next 48 hours and based on the third personal entry 482A3 being created more than ten minutes ago. The containers can be associated with priority data that indicates a ranking of the containers such that personal entries within the containers can be ranked according to the containers in which they are classified. Accordingly, in this example, the automated assistant can rank the personal entries as depicted in FIG. 4A based on the first container having priority data that indicates a higher priority than both the second container and the third container, the second container having priority data that indicates a lower priority than the first container but higher priority than the third container, and the third container having priority data that indicates a lower priority than both the first container and the second container.

In some additional and/or alternative implementations, the personal entries can be visually and/or audibly rendered at the computing device 410 based on a ranking of the containers based on a ranking of personal entries within a given one of the containers. For example, assume a first container has temporal criteria for classification that indicates all reminders having a trigger time within the next 48 hours should be classified into the first container regardless of creation time. In this example, each of the first personal entry 482A1, the second personal entry 482A2, and the third personal entry 482A3 would be classified into the first container based on a trigger time for each of the personal entries occurring within the next 48 hours. Even though each of the personal entries belong to the same container, the personal entries can be ranked within the first container based on ranking criteria, such as a trigger time, trigger location, creation time, and/or other ranking criteria. Accordingly, in this example, the automated assistant can rank the personal entries as depicted in FIG. 4A based on the first personal entry 482A1 having priority data that indicates a higher priority than both the second personal entry 482A2 and the third personal entry 482A3, the second container having priority data that indicates a lower priority than the first personal entry 482A1 but higher priority than the third personal entry 482A3, and the third container having priority data that indicates a lower priority than both the first personal entry 482A1 and the second personal entry 482A2.

In some additional and/or alternative implementations, the personal entries can be visually and/or audibly rendered at the computing device 410 based on a ranking of the containers based on a ranking of the containers and/or based on a ranking of personal entries within a given one of the containers. For example, assume a first container has temporal criteria for classification that indicates all reminders having a trigger time within the next 24 hours should be classified into the first container regardless of creation time, and assume a second container has temporal criteria for classification that indicates all reminders having a trigger time within the next 24-48 hours should be classified into the second container regardless of creation time. In this example, the first personal entry 482A1 and the second personal entry 482A2 would be classified into the first container based on a trigger time for each of the personal entries occurring within the next 24 hours, and the third personal entry 482A3 would be classified into the second container based on a trigger time for each of the personal entries occurring within the next 24-48 hours. The containers can be associated with priority data that indicates a ranking of the containers such that personal entries within the containers can be ranked according to the containers in which they are classified, and the personal entries can be ranked within each of the containers based on ranking criteria, such as a trigger time, trigger location, creation time, and/or other ranking criteria. Accordingly, in this example, the automated assistant can rank the personal entries as depicted in FIG. 4A based on the first personal entry 482A1 having priority data that indicates a higher priority than the second personal entry 482A2 based on the trigger times even though they are both classified in the first container, and the third personal entry 482A3 can be included in the group based on the first container being empty after including the first personal entry 482A1 and the second personal entry 482A2 and based on the third personal entry 482A3 being a highest ranked personal entry in a next highest priority container (e.g., the second container). In these and other manners described herein, the personal entries can be classified into one or more containers, and can be rendered audibly and/or visually by the computing device 410 based on a ranking of one or more of the containers and/or a ranking of personal entries within each of the one or more containers.

Notably, the first personal entry 482A1, the second personal entry 482A2, the third personal entry 482A3, and the other personal entries described herein can be selectable and/or include selectable content. In some implementations, upon selection of a given one of the personal entries, the automated assistant can cause the computing device 410 to render additional information related to the given personal entry and/or to render additional information related an entity associated with the personal entry via the graphical user interface 440. For example, with respect to the first personal entry 482A1, upon detecting user interface input directed generally to the reminder of "Get the mail from Mom tonight", the automated assistant can cause an information card related to the first personal entry 482A1 to be rendered visually at the graphical user interface 440 of the computing device 410. As another example, and also with respect to the first personal entry 482A1, upon detecting user interface input directed to "Mom" (e.g., as indicated by underlined text of "Mom"), the automated assistant can cause an information card related to Mom and/or a contacts application launched to a contact of "Mom" to be rendered visually at the graphical user interface 440 of the computing device 410.

In some implementations, upon selection of a given one of the personal entries, the automated assistant can cause the computing device to perform one or more actions using software application(s) installed and/or accessible by on the computing device 410. The software application(s) can include, for example, a contacts application, a phone application, a text messaging application, a SMS messaging application, an email application, a maps application, a browser application, a calendar application, a notes application, a task application, and/or other software applications. For example, with respect to the second personal entry 482A2, upon detecting user interface input directed to "Call accountant" (e.g., as indicated by underlined text of "Call accountant"), the automated assistant can cause a phone application to initiate a telephone call with the user's accountant. As another example, with respect to the third personal entry 482A3, upon detecting user interface input directed to "Pay water bill" (e.g., as indicated by underlined text of "Pay water bill"), the automated assistant can cause a browser application to initiate launch a browser to a water company payment webpage. Thus, the user of the computing device 410 can interact with various personal entries to obtain additional information related to a given personal entry and/or to cause the computing device 410 to perform one or more actions using software application(s) installed on and/or accessible by the computing device 410.

Figure 4B:
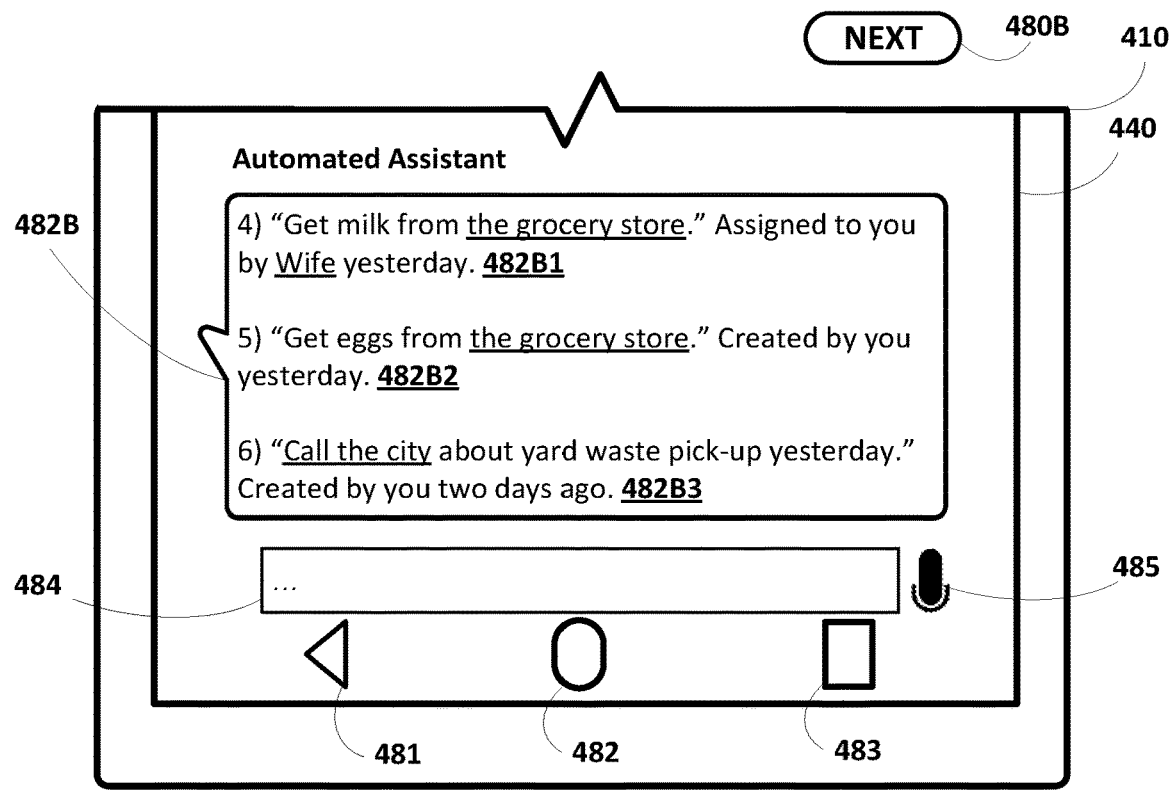

However, assume the user of the computing device 410 does not find any of the personal entries in the first group of personal entries 482A of FIG. 4A helpful, and the user desires to consume further personal entries. The user can provide further user interface input indicating a desire to consume further personal entries. As depicted in FIG. 4B, the computing device 410 can detect further user interface input 480B of "Next". The further user interface input 480B can be a further spoken utterance, further touch and/or typed input, and/or based on selection of a graphical element (e.g., suggestion chip) indicating a desire to consume further personal entries. In response to receiving the further user interface input, the automated assistant can cause the computing device 410 to render a second group of personal entries 482B that include a fourth personal entry 482B1, a fifth personal entry 482B2, and a sixth personal entry 482B3. The personal entries included in the second group of personal entries 482B can be classified into one or more containers and ranked within one or more of the containers in any manner described herein. Further, the personal entries included in the second group of personal entries 482B can be interacted with in the same manner as described with respect to the personal entries included in the first group of personal entries 482A described above with respect to FIG. 4A.

Figure 4C:
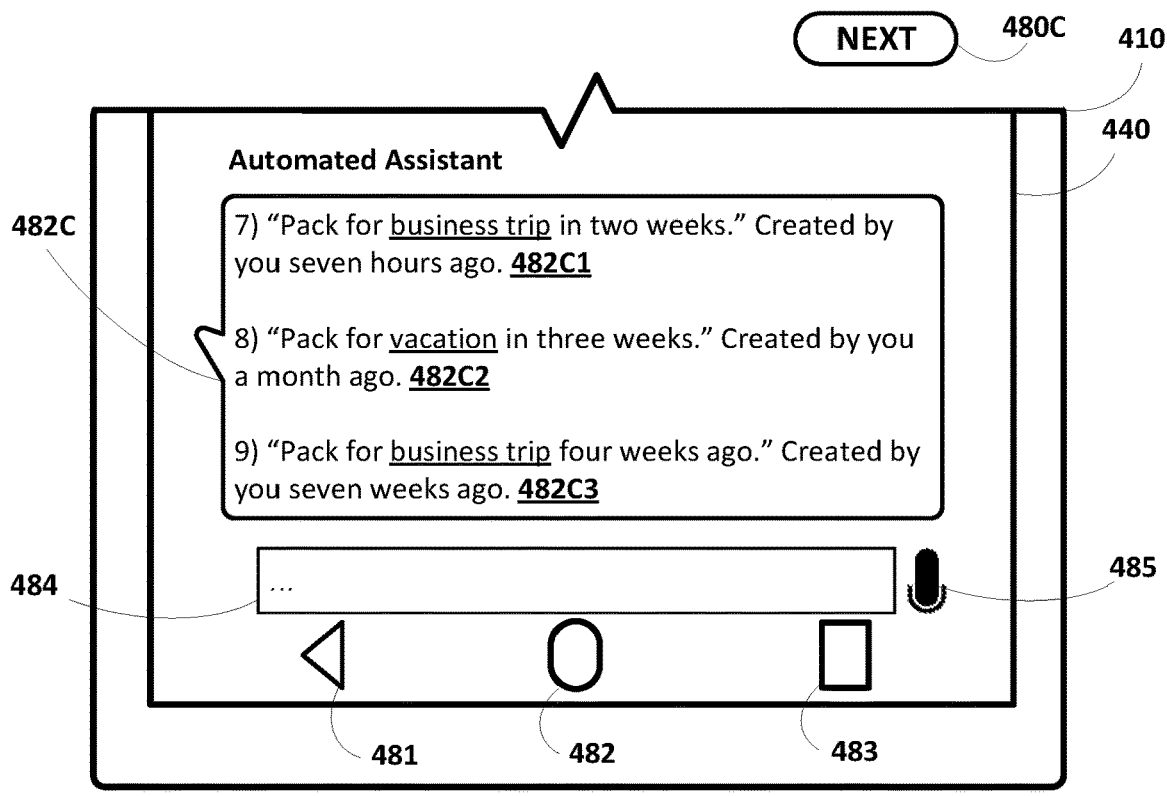

Moreover, further assume the user of the computing device 410 does not find any of the personal entries in the second group of personal entries 482B of FIG. 4B helpful, and the user desires to consume yet further personal entries. The user can provide yet further user interface input indicating a desire to consume yet further personal entries. As depicted in FIG. 4C, the computing device 410 can detect yet further user interface input 480C of "Next". The yet further user interface input 480C can be a yet further spoken utterance, yet further touch and/or typed input, and/or based on selection of a graphical element (e.g., suggestion chip) indicating a desire to consume yet further personal entries. In response to receiving the yet further user interface input, the automated assistant can cause the computing device 410 to render a third group of personal entries 482C that include a seventh personal entry 482C1, an eighth personal entry 482C2, and a ninth personal entry 482C3. The personal entries included in the third group of personal entries 482C can be classified into one or more containers and ranked within one or more of the containers in any manner described herein. Further, the personal entries included in the third group of personal entries 482C can be interacted with in the same manner as described with respect to the personal entries included in the first group of personal entries 482A described above with respect to FIG. 4A.

Figure 4D:
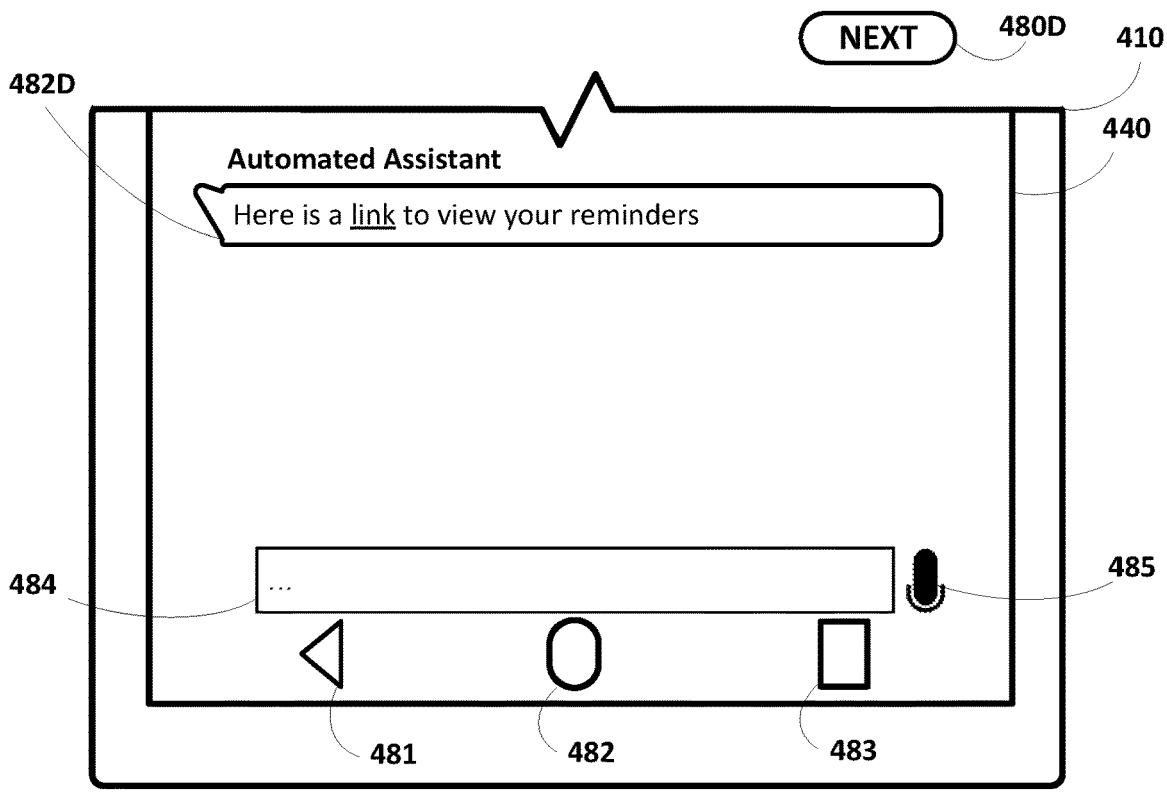

Again, further assume the user of the computing device 410 does not find any of the personal entries in the third group of personal entries 482C of FIG. 4C helpful, and the user desires to consume even further personal entries. The user can provide even further user interface input indicating a desire to consume even further personal entries. As depicted in FIG. 4D, the computing device 410 can detect even further user interface input 480D of "Next". The even further user interface input 480D can be even further spoken utterance, even further touch and/or typed input, and/or based on selection of a graphical element (e.g., suggestion chip) indicating a desire to consume yet further personal entries. However, also assume that the user of the computing device has already consumed a threshold quantity of personal entries (e.g., nine personal entries provided throughout FIGS. 4A-4C). In some implementations, rather than continuing to provide additional groups of personal entries, the automated assistant can determine to provide a deeplink to personal entries of the particular type of the original user interface input (e.g., a deeplink to the plurality of reminders). The automated assistant can determine to provide the deeplink rather than additional groups of personal entries based on the threshold quantity of personal entries being satisfied. Accordingly, in response to receiving the even further user interface input, the automated assistant can cause the computing device 410 to render a response 482D of "Here is a link to view your reminders". The response 482D, and particularly "link" included in the response 482D, can selectable such that, upon selection of the response, the automated assistant can cause the computing device 410 to render a reminder center via the graphical user interface 440 of the computing device 410, thereby allowing the user to browse through a plurality of reminders that are personal to the user. Moreover, as described herein (e.g., with respect to feedback engine 150 of FIG. 1, and FIGS. 5B and 5C), one or more weights for ranking the containers and/or ranking the personal entries within each of the containers can be updated based a user's feedback in response to a given group of personal entries being presented to the user via the computing device 410.

Figure 5A:
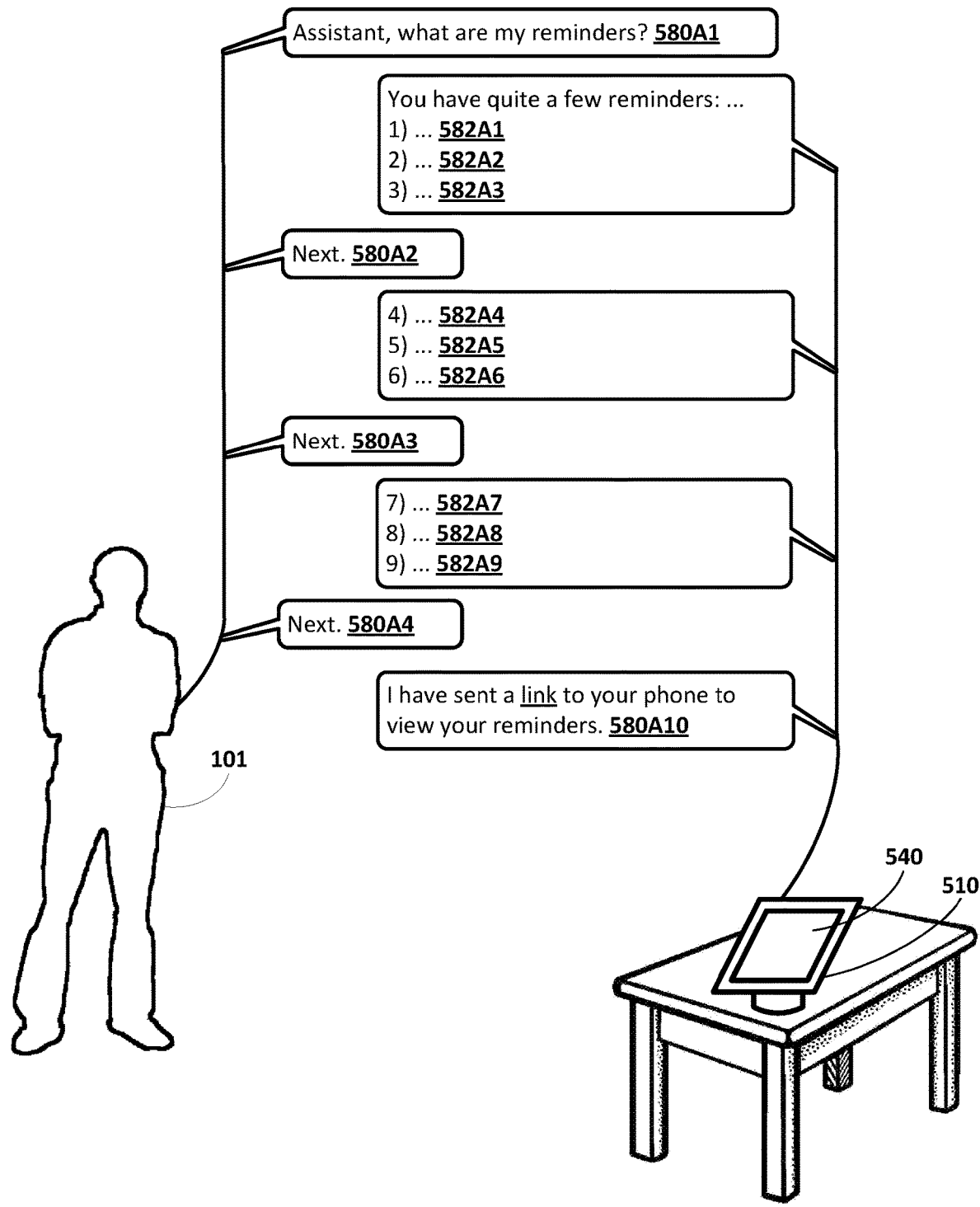
FIGS. 5A, 5B, and 5C depict various non-limiting examples of a given user of a computing device interacting with an automated assistant to obtain personal entries responsive to a vague request for the personal entries, in accordance with various implementations.
Figure 5B:
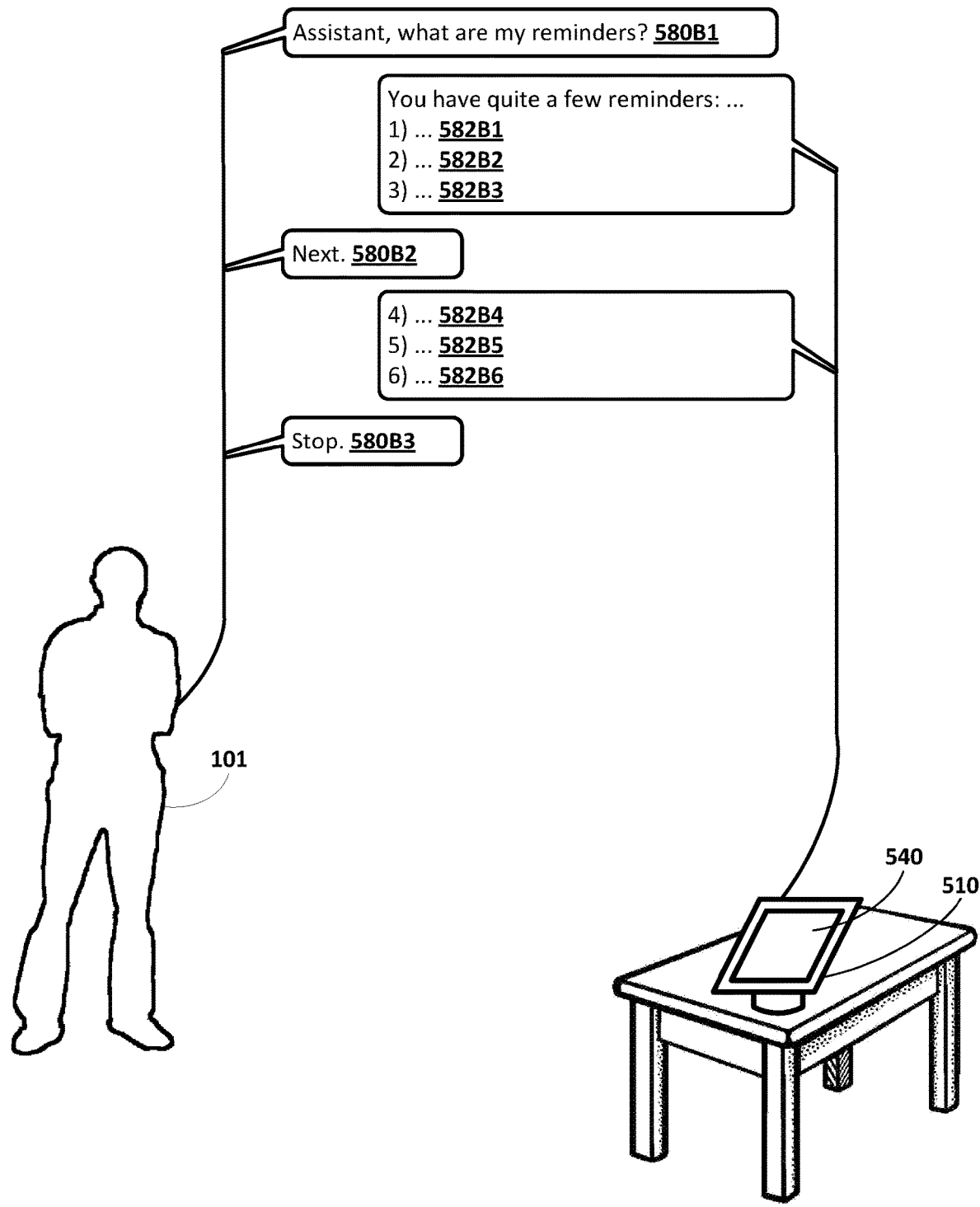
Figure 5C:
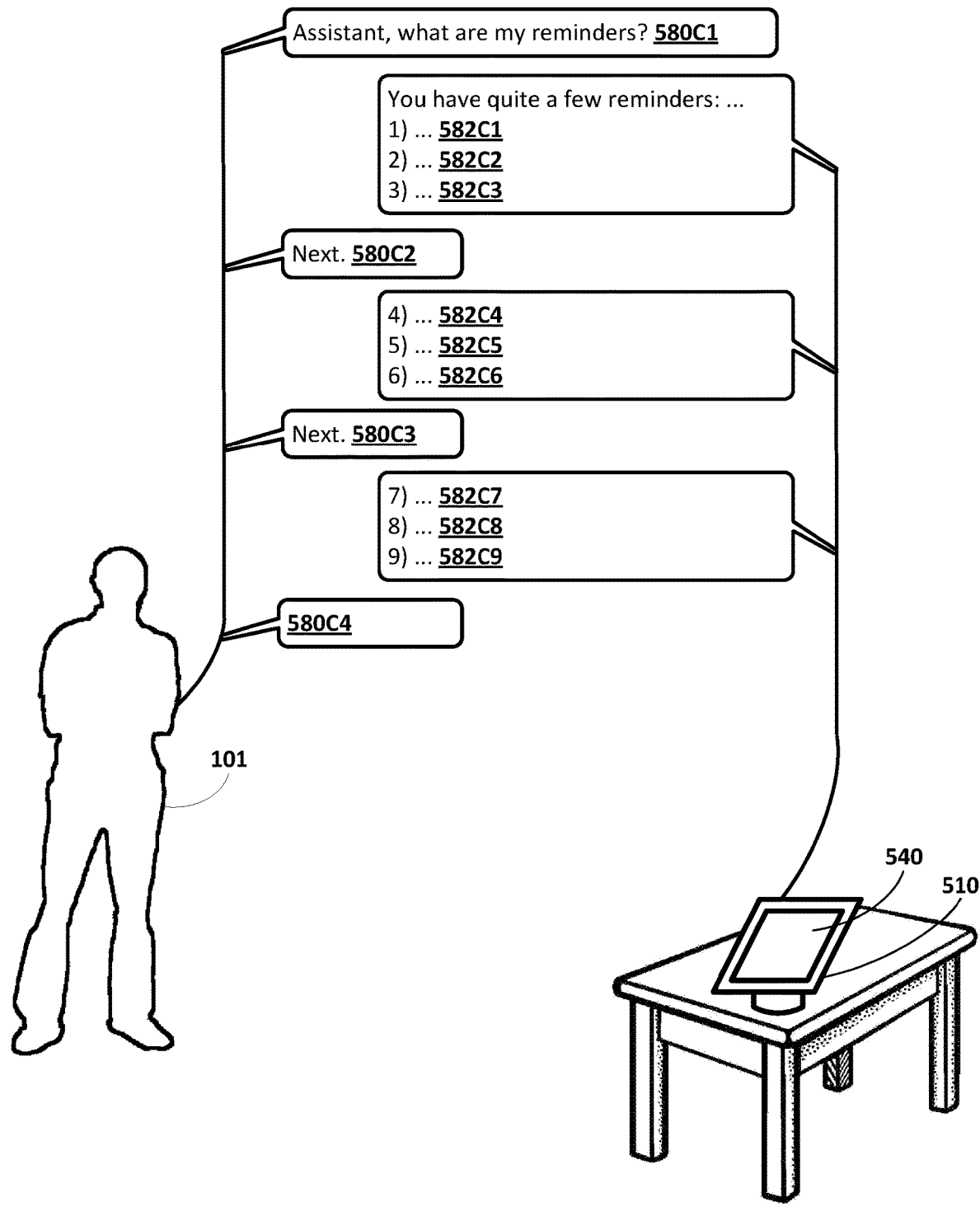

Referring now to FIGS. 5A-5C, various non-limiting examples of a user 101 of a computing device 510 interacting with an automated assistant (e.g., automated assistant 120 of FIG. 1) to obtain personal entries are described. FIGS. 5A-5C each depict a computing device 510 audibly rendering (e.g., via speaker(s) of the computing device 510) examples of interactions (e.g., dialog) between a user 101 of the computing device 510 and an automated assistant according to implementations disclosed herein. One or more aspects of the automated assistant may be implemented locally on the computing device 510 and/or on one or more computing devices that are in network communication with the computing device 510 (e.g., via network(s) 190 of FIG. 1). Although the computing device 510 of FIGS. 5A-5C is depicted as having a speaker connected to a graphical user interface, it should be understood that is not meant to be limiting. The computing device 510 can be, for example, a stand-alone speaker, a mobile phone, a laptop, a desktop computer, and/or any other computing device capable of executing an automated assistant. Moreover, although the dialog of FIGS. 5A-5C is depicted as a voice-based conversation between the user 101 and the automated assistant that is not meant to be limiting. It should be understood that the dialog can additionally and/or alternatively be rendered visually on the graphical user interface 540 of the computing device 510 as described with respect to FIGS. 4A-4D. Although the dialog of FIGS. 5A-5C is depicted with respect to reminders, it should be understood that is for the sake of example and not meant to be limiting. Moreover, although the personal entries depicted in the dialog of FIGS. 5A-5C (e.g., 582A1-582A9, 582B1-582B6, and 582C1-582C9) are depicted as not including any actual content, that is for the sake of brevity and is not meant to be limiting. It should be understood that the content included in the personal entries may depend on personal entries that are created by the user, assigned to the user by an additional user, and/or other content that is personal to the user.

Turning now to FIG. 5A, the computing device 410 detects (e.g., using user interface engine 111 of FIG. 1) user input 580A1 of "Assistant, what are my reminders?" In some implementations, the user input 580A1 can be a spoken utterance detected via microphone(s) of the computing device 510. In some versions of those implementations, audio data that captures the spoken utterance can be processed, using speech recognition model(s), locally on the computing device 510 and/or or remotely at additional computing device(s) to generate recognized text. In some further versions of those implementations, the recognized text can be visually rendered on the graphical user interface 540 as part of the dialog.

Notably, the dialog flow of FIG. 5A includes a similar dialog that results in the response 482D that includes the deeplink of FIG. 4D. However, with respect to FIG. 5A, a response 580A10 of "I have sent a link to your phone to view your reminders" is rendered by the computing device 510. In some implementations, the response 580A10 of FIG. 5A indicates that rather than the deeplink being accessible at the computing device 510, the automated assistant determined to send the deeplink to a mobile device of the user 101 (e.g., via network(s) 190 of FIG. 1). By sending the deeplink to the mobile device of the user 101 rather than locally on the graphical user interface 540 of the client device, the user 101 can view any additional reminders at the user's convenience using their mobile device. In some additional and/or alternative implementations, the deeplink can also be accessed locally on the computing device 510 in the same manner as depicted in FIG. 4D.

Turning now to FIGS. 5B and 5C, and as described herein, the automated assistant can update one or more weights for ranking the containers and/or for ranking the personal entries within each of the containers based on feedback signals (or lack thereof) from the user 101 of the computing device 510 during the dialog. In some implementations, the feedback can include negative feedback signals. For example, with respect to FIG. 5B, the automated assistant can determine, based on further user interface input 580B2 of "Next" that the user 101 is not interested in personal entries 582B1-582B3. Thus, the automated assistant can utilize the further user interface input 580B2 of "Next" as a negative feedback signal to update one or more weights associated with one or more containers in which the personal entries 582B1-582B3 are classified. As depicted in FIG. 5B, if each of the personal entries 582B1-582B3 are associated with a particular container, then one or more weights associated with the particular container can be updated to reflect the particular container should be associated with updated priority data indicating the particular container should be given a lower priority. As another example, if each of the personal entries 582B1-582B3 are associated with disparate containers, then one or more weights associated with each of the disparate containers can be updated to reflect the each of the disparate containers should be associated with updated priority data indicating that each of the disparate containers should have a lower priority.

In some implementations, the feedback can include positive feedback signals. For example, with respect to FIG. 5B, the automated assistant can determine, based on yet further user interface input 580B3 of "Stop" that the user 101 is interested in one or more of personal entries 582B4-582B6. Thus, the automated assistant can utilize the yet further user interface input 580B3 of "Stop" as a positive feedback signal to update one or more weights associated with one or more containers in which the personal entries 582B4-582B6 are classified. As depicted in FIG. 5B, if each of the personal entries 582B4-582B6 are associated with a particular container, then one or more weights associated with the particular container can be updated to reflect the particular container should be associated with updated priority data indicating the particular container should be given a higher priority. As another example, if each of the personal entries 582B4-582B6 are associated with disparate containers, then one or more weights associated with each of the disparate containers can be updated to reflect the each of the disparate containers should be associated with updated priority data indicating that each of the disparate containers should be given a higher priority.

In some versions of those implementations, the automated assistant can determine which of the particular personal entries, in a given group of personal entries, that are of interest to the user 101 of the computing device 510 based on when the yet further user interface input 580B3 of "Stop" is detected at the computing device 510 and/or based on sensor data of one or more computing devices associated with the user 101. For example, if the yet further user interface input 580B3 of "Next" is received subsequent to rendering a fifth personal entry 582B5 and prior to rendering a sixth personal entry 582B6 (i.e., the user 101 interrupts rendering of a group of personal entries), then the automated assistant can infer that the user was interested in the fifth personal entry 582B5 as opposed to a fourth personal entry 582B4 or a sixth personal entry 582B6. As another example, if the fifth personal entry 582B5 includes a reminder of "Get milk from the grocery store", and location data of a mobile device of the user 101 indicates that the user 101 went to the grocery store and/or purchase history of the user 101 indicates that the user 101 bought milk subsequent to consuming the fifth personal entry 582B5, then the automated assistant can infer that the user was interested in the fifth personal entry 582B5 as opposed to a fourth personal entry 582B4 or a sixth personal entry 582B6. In these examples, one or more weights associated with one or more containers in which the fifth personal entry 582B5 can be updated to reflect updated priority data indicating that the one or more containers in which the fifth personal entry 582B5 should be given a higher priority.

In some versions of those implementations, no further user interface input can also be utilized as a positive feedback signal. For example, as depicted in FIG. 5C, the dialog cycles through three groups of personal entries, and after rendering of the third group that includes personal entries 582C7-582C9, the user does not provide any further input as indicated at 580C4. In this example, the automated assistant can infer that the user 101 is interested in one or more of personal entries 582C7-582C9, and one or more weights for the container(s) in which the personal entries 582C7-582C9 are classified can be updated to reflect the container(s) should be associated with updated priority data indicating the container(s) should be given a higher priority. This updating can be similar to that described above with respect to the positive feedback signals of FIG. 5B.

Moreover, it should be noted that each of the updates for the one or more weights of the ranking can be weighted. In some implementations, if each personal entry in a group is classified into a same container, then the update can be weighted more heavily than if each of the personal entries in the group are classified into disparate containers. For example, a first group of personal entries 582C1-582C3 each belong to a first container and further user input 582C3 of "Next" is detected at the computing device 510, then the negative update can be multiplied by a larger factor (e.g., 1, 3, or any other factor) to reflect that none of the personal entries in the first group from the first container were of interest to the user. In contrast, if the first group of personal entries 582C1-582C3 each belong to disparate containers and the further user input 582C3 of "Next" is detected at the computing device 510, then the negative update can be multiplied by a smaller factor (e.g., ⅓, 1, or any other factor) to reflect that none of the personal entries in the first group from each of the disparate containers were of interest to the user. In some additional and/or alternative implementations, updates can be weighted more heavily for groups of personal entries that are presented earlier in a dialog than groups of personal entries that are presented later in the dialog. For example, if the positive feedback signal in FIG. 5B (e.g., further user interface input 580B3) is received after rendering of a second group of personal entries and if the positive feedback signal in FIG. 5C (e.g., no further user input as indicated by 580C4) is received after rendering of a third group of personal entries, then the positive feedback signal in FIG. 5B can be weighted more heavily than the positive feedback signal in FIG. 5C. In this manner, weighted updates for rankings of containers and/or for personal entries within each of the containers can be performed without over-emphasizing the interest of the user 101 in particular personal entries. This technique is particularly advantageous when containers having high priority data include few personal entries, whereas containers having lower prior data have a multitude of personal entries.

Figure 6:
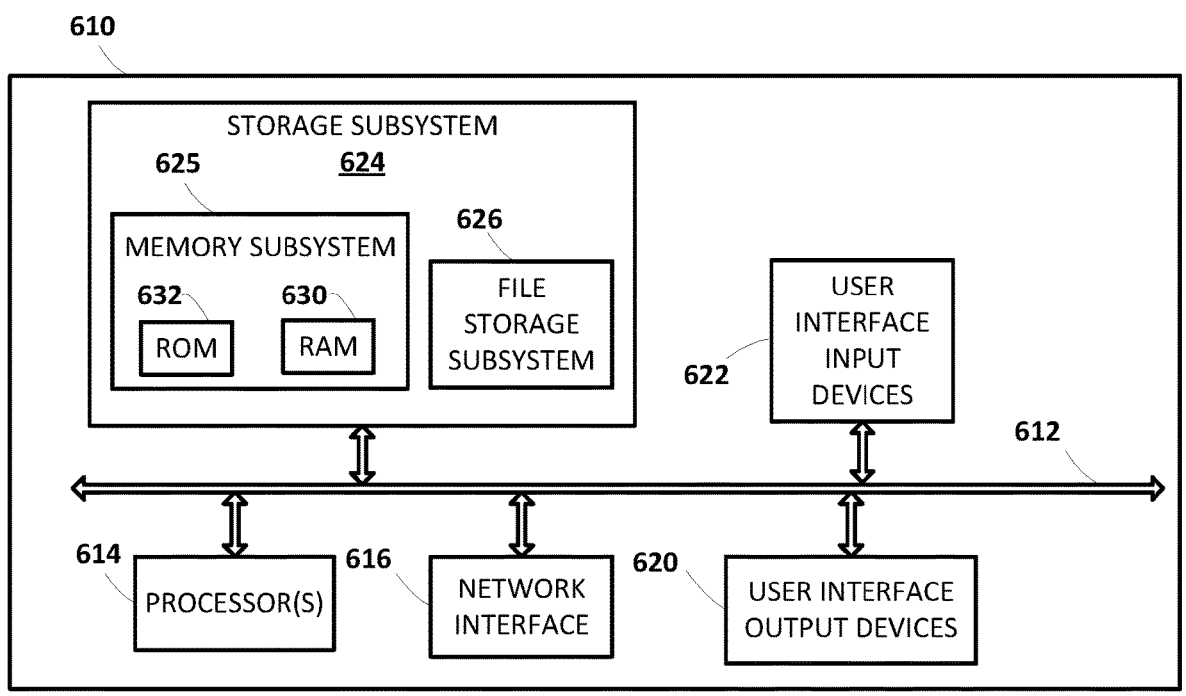
FIG. 6 depicts an example architecture of a computing device, in accordance with various implementations.

FIG. 6 depicts an example architecture of a computing device 610 that may optionally be utilized to perform one or more aspects of techniques described herein. In some implementations, one or more of a client computing device, user-controlled resources module, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the processes of FIG. 2 and/or FIG. 3, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   processing audio data that captures a spoken utterance of a user and that is detected via one or more microphones of a client device;
   determining, based on processing the audio data, that the spoken utterance includes a vague request for personal entries that are assigned to a particular type, without specifying any additional features, of the personal entries, that are in addition to the particular type, wherein the vague request for the personal entries that are assigned to the particular type does not specify any of: a temporal feature for the personal entries, a location feature for the personal entries, a creation feature for the personal entries, or an assignment feature for the personal entries;
   in response to determining that the spoken utterance includes the vague request for the personal entries that are assigned to the particular type, without specifying the additional features:
      selecting, from a group of personal entries that are each access-restricted, personal to the user, and assigned to the particular type, only a subgroup of the personal entries, wherein selecting only the subgroup of the personal entries comprises:
         accessing a data structure that:
            for each personal entry of the group of personal entries, assigns the personal entry as a member of only a corresponding subset of containers and from among a plurality of disparate containers, the corresponding subset of containers being for the particular type and being assigned container rankings that ranks the plurality of disparate containers relative to one another, and
            for each container, of the plurality of disparate containers, that is non-empty and that includes at least two of the personal entries assigned as members, ranks assigned personal entries based on personal entry rankings that rank the assigned personal entries assigned as members, of the container, relative to one another;
         selecting, based on the container rankings, multiple non-empty containers of the plurality of disparate containers, and
         selecting, based on the personal entry rankings and from the selected multiple non-empty containers of the plurality of disparate containers, the personal entries to include in the subgroup, and the personal entries selected for inclusion in the subgroup being selected from at least two non-empty containers from the multiple non-empty containers; and causing a representation of at least one of the personal entries, of the subgroup, to be rendered at the client device as an initial response to the spoken utterance.

2. The method of claim 1, wherein selecting, based on the container rankings, the multiple non-empty containers of the plurality of disparate containers comprises:
initially selecting, based on the container rankings, a highest ranking container of the non-empty containers of the plurality of disparate containers;

wherein selecting, based on the personal entry rankings and from the selected multiple non-empty containers of the plurality of disparate containers, the personal entries to include in the subgroup comprises:
initially selecting, based on the personal entry rankings of the personal entries assigned as members of the highest ranking container, a plurality of the personal entries that are members of the highest ranking container to include in the subgroup.

3. The method of claim 2, wherein selecting only the subgroup of the personal entries further comprises:
determining that the plurality of the personal entries selected in the initially selecting fails to satisfy a threshold quantity of personal entries to include in the subgroup; and wherein selecting, based on the container rankings, the multiple non-empty containers of the plurality of disparate containers comprises:
in response to determining that the plurality of the personal entries selected in the initially selecting fails to satisfy the threshold quantity:
next selecting, following the initially selecting, a second highest ranking container of the non-empty containers of the plurality of disparate containers; and wherein selecting, based on the personal entry rankings and from the selected multiple non-empty containers of the plurality of disparate containers, the personal entries to include in the subgroup comprises:
in response to next selecting the second highest ranking container:
next selecting, based on the personal entry rankings of the personal entries assigned as members of the second highest ranking container, at least one additional personal entry that are members of the second highest ranking container to include in the subgroup.

4. The method of claim 3, further comprising:
determining the threshold quantity based on one or more properties of the client device.

5. The method of claim 1, wherein only a subset of the non-empty containers of the plurality of disparate containers are selected during selecting only the subgroup of the personal entries.

6. The method of claim 1, wherein a highest ranking container, of the containers, according to the personal entry rankings, is restricted to including, as members, personal entries that were created and/or edited within a threshold duration of a current time.

7. The method of claim 6, wherein the threshold duration is less than twenty four hours.

8. The method of claim 1, further comprising:
determining, based on one or more dynamic properties of the client device, a current state of the client device when the spoken utterance is captured; and
determining the container rankings, used in the selecting, based on the current state of the client device.

9. The method of claim 8, wherein the current state of the client device indicates that the user is in transit, and wherein determining the container rankings, used in the selecting, based on the current state of the client device comprises:
increasing a ranking of a given container, of the containers, that is restricted to including, as members, personal entries that each include at least one location-based triggering criterion.

10. The method of claim 1, wherein the data structure and the personal entries are stored locally at the client device prior to processing the audio data that captures the spoken utterance, and wherein the one or more processors are of the client device.

11. The method of claim 1, wherein the particular type is a reminder type or a list type, or is a genus type that encompasses the reminder type and the list type.

12. The method of claim 1, further comprising, prior to processing the audio data that captures the spoken utterance:
generating, based on one or more instances of user interface input received at the client device or an additional client device, a given personal entry, of the personal entries of the corpus, that is of the particular type;
assigning, in the data structure, the given personal entry as a member of at least a given container of the plurality of disparate containers; and
generating a given personal entry ranking for the given personal entry, for the given container, based on comparing one or more properties of the given personal entry to one or more other properties of other personal entries assigned as members of the given container, wherein the given personal entry ranking is one of the personal entry rankings for the given container.

13. The method of claim 12, wherein the given container is restricted to including, as members, personal entries that were created and/or edited within a threshold duration of a current time, and wherein assigning, in the data structure, the given personal entry as a member of at least the given container of the containers comprises:
assigning the given personal entry to the given container based on the given personal entry being created within the threshold duration, and assigning, to the given personal entry, a time to live value that causes removal of the given personal entry from the given container after expiration of the threshold duration.

14. The method of claim 13, wherein assigning, in the data structure, the given personal entry as a member of at least the given container of the containers comprises:
prior to or after expiration of the threshold duration, assigning the given personal entry to an additional given container of the plurality of disparate containers, wherein assigning the given personal entry to the additional given container is based on at least one property, of the given personal entry, conforming to a requirement of the additional given container, wherein the at least one property is in addition to a creation time or edit time of the given personal entry.

15. The method of claim 1, further comprising, prior to processing the audio data that captures the spoken utterance:

determining that a given personal entry, assigned in the data structure to at least a given container of the plurality of disparate containers, is stale; and responsive to determining that the given personal entry is stale:

removing, from the data structure, any assignment of the given personal entry to any of the containers.

16. A system comprising:

one or more processors; and memory storing instructions that, when executed by the one or more processors, cause the one or more processors to:

process audio data that captures a spoken utterance of a user and that is detected via one or more microphones of a client device;

determine, based on processing the audio data, that the spoken utterance includes a vague request for personal entries that are assigned to a particular type, without specifying any additional features, of the personal entries, that are in addition to the particular type, wherein the vague request for the personal entries that are assigned to the particular type does not specify any of: a temporal feature for the personal entries, a location feature for the personal entries, a creation feature for the personal entries, or an assignment feature for the personal entries;

in response to determining that the spoken utterance includes the vague request for the personal entries that are assigned to the particular type, without specifying the additional features:

select, from a group of personal entries that are each access-restricted, personal to the user, and assigned to the particular type, only a subgroup of the personal entries, wherein the instructions to select only the subgroup of the personal entries comprise instructions to:

access a data structure that:

for each personal entry of the group of personal entries, assigns the personal entry as a member of only a corresponding subset of containers and from among a plurality of disparate containers, the corresponding subset of containers being for the particular type and being assigned container rankings that ranks the plurality of disparate containers relative to one another, and for each container, of the plurality of disparate containers, that is non-empty and that includes at least two of the personal entries assigned as members, ranks assigned personal entries based on personal entry rankings that rank the assigned personal entries assigned as members, of the container, relative to one another;

select, based on the container rankings, multiple non-empty containers of the plurality of disparate containers, and select, based on the personal entry rankings and from the selected multiple non-empty containers of the plurality of disparate containers, the personal entries to include in the subgroup, and the personal entries selected for inclusion in the subgroup being selected from at least two non-empty containers from the multiple non-empty containers; and cause a representation of at least one of the personal entries, of the subgroup, to be rendered at the client device as an initial response to the spoken utterance.

17. A non-transitory computer-readable storage medium storing instructions that, when executed by one or more processors, cause the one or more processors to perform operations, the operations comprising:

processing audio data that captures a spoken utterance of a user and that is detected via one or more microphones of a client device;

determining, based on processing the audio data, that the spoken utterance includes a vague request for personal entries that are assigned to a particular type, without specifying any additional features, of the personal entries, that are in addition to the particular type, wherein the vague request for the personal entries that are assigned to the particular type does not specify any of: a temporal feature for the personal entries, a location feature for the personal entries, a creation feature for the personal entries, or an assignment feature for the personal entries;

in response to determining that the spoken utterance includes the vague request for the personal entries that are assigned to the particular type, without specifying the additional features:

selecting, from a group of personal entries that are each access-restricted, personal to the user, and assigned to the particular type, only a subgroup of the personal entries, wherein selecting only the subgroup of the personal entries comprises:

accessing a data structure that:

for each personal entry of the group of personal entries, assigns the personal entry as a member of only a corresponding subset of containers and from among a plurality of disparate containers, the corresponding subset of containers being for the particular type and being assigned container rankings that ranks the plurality of disparate containers relative to one another, and for each container, of the plurality of disparate containers, that is non-empty and that includes at least two of the personal entries assigned as members, ranks assigned personal entries based on personal entry rankings that rank the assigned personal entries assigned as members, of the container, relative to one another;

selecting, based on the container rankings, multiple non-empty containers of the plurality of disparate containers, and selecting, based on the personal entry rankings and from the selected multiple non-empty containers of the plurality of disparate containers, the personal entries to include in the subgroup, and the personal entries selected for inclusion in the subgroup being selected from at least two non-empty containers from the multiple non-empty containers; and causing a representation of at least one of the personal entries, of the subgroup, to be rendered at the client device as an initial response to the spoken utterance.

* * * * *